(12) United States Patent
Furukawa et al.

(10) Patent No.: US 9,384,457 B2
(45) Date of Patent: Jul. 5, 2016

(54) PHYSICAL DISTRIBUTION MANAGEMENT SYSTEM AND PHYSICAL DISTRIBUTION MANAGEMENT METHOD

(71) Applicants: Takahiro Furukawa, Shizuoka (JP); Daisuke Tezuka, Tokyo (JP)

(72) Inventors: Takahiro Furukawa, Shizuoka (JP); Daisuke Tezuka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 14/331,548

(22) Filed: Jul. 15, 2014

(65) Prior Publication Data

US 2015/0028095 A1     Jan. 29, 2015

(30) Foreign Application Priority Data

Jul. 25, 2013   (JP) .................................. 2013-155068
May 23, 2014  (JP) .................................. 2014-107565

(51) Int. Cl.
*G06K 7/00* (2006.01)
*G06Q 10/08* (2012.01)

(52) U.S. Cl.
CPC ...................................... *G06Q 10/08* (2013.01)

(58) Field of Classification Search
USPC ........................... 235/375, 385; 705/5, 28–45
See application file for complete search history.

(56) References Cited

U.S. PATENT DOCUMENTS

| 7,809,467 B2 | 10/2010 | Schaefer |
| 2003/0093171 A1 | 5/2003 | Soehnlen |
| 2004/0193311 A1 | 9/2004 | Winkler |
| 2005/0193688 A1* | 9/2005 | Iwamura ................. B65B 5/024 |
| | | 53/410 |
| 2006/0226989 A1* | 10/2006 | Hillegass ............. B07C 5/3412 |
| | | 340/572.7 |
| 2012/0150340 A1 | 6/2012 | Suess et al. |

FOREIGN PATENT DOCUMENTS

| EP | 0330495 A2 | 8/1989 |
| EP | 2602118 A1 | 6/2013 |
| JP | 2003-004403 | 1/2003 |
| JP | 2003-146438 | 5/2003 |
| JP | 2003-300606 | 10/2003 |
| JP | 2004-090026 | 3/2004 |
| JP | 2006-245483 | 9/2006 |
| JP | 2006-247715 | 9/2006 |
| WO | WO-2012033146 A1 | 3/2012 |

OTHER PUBLICATIONS

Extended European Search Report dated Jan. 5, 2015.

* cited by examiner

*Primary Examiner* — Matthew Mikels
(74) *Attorney, Agent, or Firm* — Harness, Dickey & Pierce

(57) ABSTRACT

A physical distribution management system includes an information write unit that writes, on an information recording medium attached to a conveyance container input to a conveyance unit, a size of the conveyance container; a size detection unit that detects the size of the conveyance container input to the conveyance unit; and an error detection unit that determines that an input error for the conveyance container input to the conveyance unit occurs when the size written on the information recording medium attached to the conveyance container input to the conveyance unit does not coincide with the size of the conveyance container input to the conveyance unit detected by the size detection unit.

20 Claims, 18 Drawing Sheets

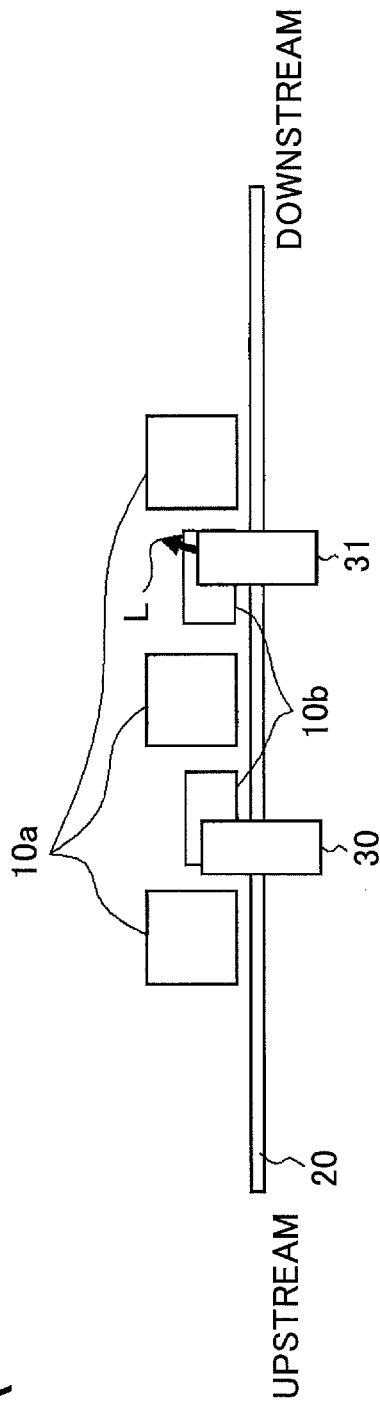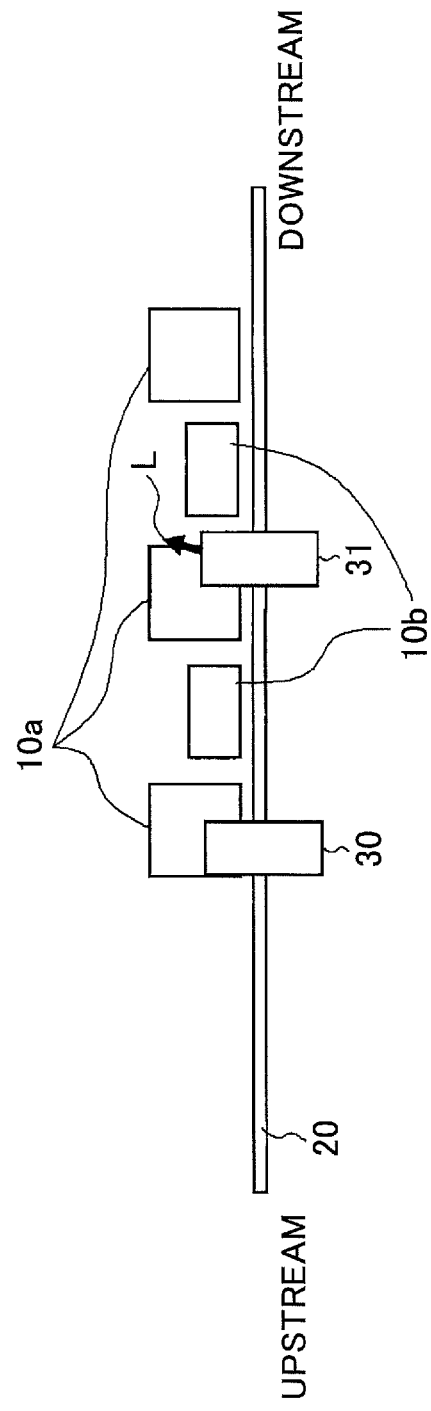

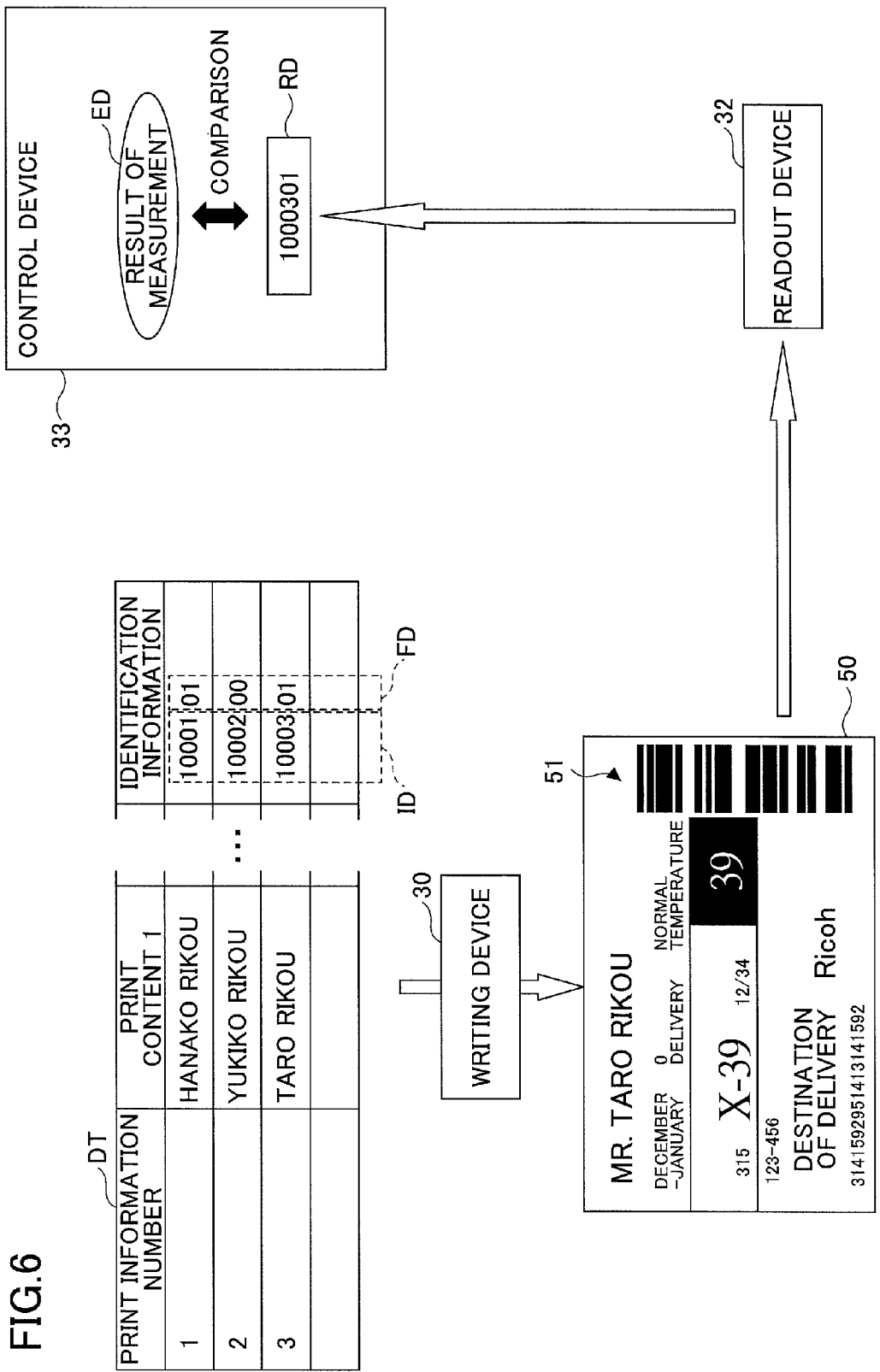

FIG.19A

| PRINT INFORMATION NUMBER | PRINT CONTENT 1 | SIZE INFORMATION | INPUT STATE | SIZE MEASUREMENT STATE |
|---|---|---|---|---|
| 1 | HANAKO RIKOU | LARGE | COMPLETED | COMPLETED |
| 2 | YUKIKO RIKOU | SMALL | COMPLETED | COMPLETED |
| 3 | TARO RIKOU | SMALL | COMPLETED | |
| 4 | JIRO RIKOU | LARGE | | |
| 5 | SABURO RIKOU ··· | LARGE | | |
| 6 | TSUKIKO RIKOU | SMALL | | |
| | | | | |

| PRINT INFORMATION NUMBER | PRINT CONTENT 1 | SIZE INFORMATION | INPUT STATE | SIZE MEASUREMENT STATE |
|---|---|---|---|---|
| 1 | HANAKO RIKOU | LARGE | COMPLETED | COMPLETED |
| 2 | YUKIKO RIKOU | SMALL | COMPLETED | COMPLETED |
| 3 | TARO RIKOU | SMALL | COMPLETED | (ERROR) |
| 4 | JIRO RIKOU | LARGE | COMPLETED | |
| 5 | SABURO RIKOU ··· | LARGE | | |
| 6 | TSUKIKO RIKOU | SMALL | | |
| | | | | |

| PRINT INFORMATION NUMBER | PRINT CONTENT 1 | SIZE INFORMATION | INPUT STATE | SIZE MEASUREMENT STATE |
|---|---|---|---|---|
| 1 | HANAKO RIKOU | LARGE | COMPLETED | COMPLETED |
| 2 | YUKIKO RIKOU | SMALL | COMPLETED | COMPLETED |
| 4 | JIRO RIKOU | LARGE | COMPLETED | |
| 3 | TARO RIKOU | SMALL | | |
| 5 | SABURO RIKOU ··· | LARGE | | |
| 6 | TSUKIKO RIKOU | SMALL | | |
| | | | | |

EP → 4
IP → 3

PHYSICAL DISTRIBUTION MANAGEMENT SYSTEM AND PHYSICAL DISTRIBUTION MANAGEMENT METHOD

BACKGROUND OF THE INVENTION

1. Field of the Invention

The disclosures herein generally relate to a physical distribution management system and a physical distribution management method in which a conveyance container is placed on a conveyance unit and is conveyed, and in particular relates to a physical distribution management system and a physical distribution management method in which an error in an input sequence (in the following, called an "error in category input sequence") of plural kinds of conveyance containers mixed on the conveyance unit can be detected.

2. Description of the Related Art

On some plastic containers as conveyance containers used in a factory, for example, heat sensitive type labels, on which destinations of articles held in the containers or names of the articles are printed, are applied. These labels have a property of turning colors by heat, and it is possible to write a character or a symbol onto the labels by using a thermal head or the like.

Moreover, rewritable type heat sensitive papers are used for the above described container labels, on which write/erase operations can be repeated. In order to use such labels for physical distributions, it is desirable that the write/erase operations on the labels can be performed while being attached to containers. For that purpose, for example, Japanese Published Patent Application No. 2004-90026 discloses an information writing device called a laser marker, which emits laser light on the label contactlessly to heat it, thereby writing a character or the like.

The above-described laser marker may be used for printing destinations of articles or names of articles in a process of conveying and sorting the articles in a factory, a distribution center or the like. Specifically, heat sensitive type labels are applied to surfaces on containers serially conveyed by a conveyer as a conveyance device in the factory, and printing is performed on each of the heat sensitive type labels.

Print information to be written on the heat sensitive type label includes information which is fixed within an arbitrary period and information which is different for each of the objects for writing.

The above-described information may be managed on the side of the writing device such as the laser marker, but generally the above information is managed and controlled by a personal computer, which may be denoted as a host PC or a higher level device, connected to the writing device such as the laser marker via a communication mechanism.

In a conveyance system installed in the above described distribution center or the like, plural kinds of containers to be input into the conveyer may be mixed. For example, regarding the size of a container (outer size, inner size, volume or capacity), when a size of an article held in a container is small, a small-sized container is used. When the size of the article held in a container is large, a large-sized container is used. In this way, by using plural kinds of containers having a size according to the content, a space of a conveyance vehicle in the final stage of the conveyance can be used effectively.

In the above-described conveyance system in which containers having different sizes are mixed, an error in the input sequence of the containers may occur. Since a size of container generally corresponds to an article held in the container, the size of the container input to the conveyer is also managed by the conveyance system. However, the process of inputting the container into the conveyer is performed manually in general, and there may be a risk of inputting a container having a size different from the size instructed by the system. In the specification of the present application, the above described error will be denoted as "error in input sequence by size"

When the error in input sequence by size occurs and a container is conveyed to a process of storing an article in the container, which will be called "article storage process", without detecting the error, a serious problem may occur. That is, when a small container is input at a timing of inputting a large container, a trouble that an article to be stored cannot be stored in the container occurs in the stage of storing the article in the container.

In the above case, it may not be recovered from the trouble by merely re-inputting a container. Depending on the configuration of the conveyance system, all containers input after the container which has generated the error in an input sequence may need to be re-input. Accordingly, it is an important object to detect the error in input sequence by size early.

Japanese Published Patent Application No. 2003-300606 discloses a picking system that can detect an error in input sequence of containers input to a conveyer. In the picking system, information recording media applied to containers are issued, wherein identification information for identifying the container is recorded on the information recording medium, the container identification information is sent to an operation zone on the conveyance path in the sequence that the information recording media are issued. The container identification information applied to the container is read out in each operation zone, and it is determined whether the readout container identification information is the same sequence as the issued identification information, thereby detecting the error in input sequence.

However, in the picking system disclosed in Japanese Published Patent Application No. 2003-300606, a size or a shape of a container is not taken into account, and an error in input sequence by type, such as an error in input sequence by size or an error in input sequence by shape, cannot be detected.

SUMMARY OF THE INVENTION

It is a general object of at least one embodiment of the present invention to provide a physical distribution management system and a physical distribution management method that substantially obviate one or more problems caused by the limitations and disadvantages of the related art.

In one embodiment, a physical distribution management system includes an information write unit that writes, on an information recording medium attached to a conveyance container input to a conveyance unit, a size of the conveyance container; a size detection unit that detects the size of the conveyance container input to the conveyance unit; and an error detection unit that determines that an input error for the conveyance container input to the conveyance unit occurs when the size written on the information recording medium attached to the conveyance container input to the conveyance unit does not coincide with the size of the conveyance container input to the conveyance unit detected by the size detection unit.

In another embodiment, a physical distribution management method includes writing, on an information recording medium attached to a conveyance container input to a conveyance unit, a size of the conveyance container; detecting the size of the conveyance container input to the conveyance unit; and determining that an input error for the conveyance container input to the conveyance unit occurs when the size written on the information recording medium attached to the conveyance container input to the conveyance unit does not coincide with the detected size of the conveyance container input to the conveyance unit.

According to the present invention, an error in input sequence by type of a conveyance container input to a conveyance device can be detected.

BRIEF DESCRIPTION OF THE DRAWINGS

Other objects and further features of embodiments will be apparent from the following detailed description when read in conjunction with the accompanying drawings, in which:

FIGS. 5A and 5B are explanatory diagrams illustrating a principle of measurement by a measurement device in the physical distribution management system according to the first embodiment;

FIG. 6 is an explanatory diagram illustrating an example of a schematic operation of the physical distribution management system according to the first embodiment;

FIGS. 19A to 19C are diagrams illustrating an example of change in content in a print information management table during the process of the operation of the physical distribution management system according to the fourth embodiment.

DESCRIPTION OF THE PREFERRED EMBODIMENTS

In the following, embodiments of the present invention will be described with reference to the accompanying drawings.

First Embodiment

Configuration of Physical Distribution Management System

Figure 1:
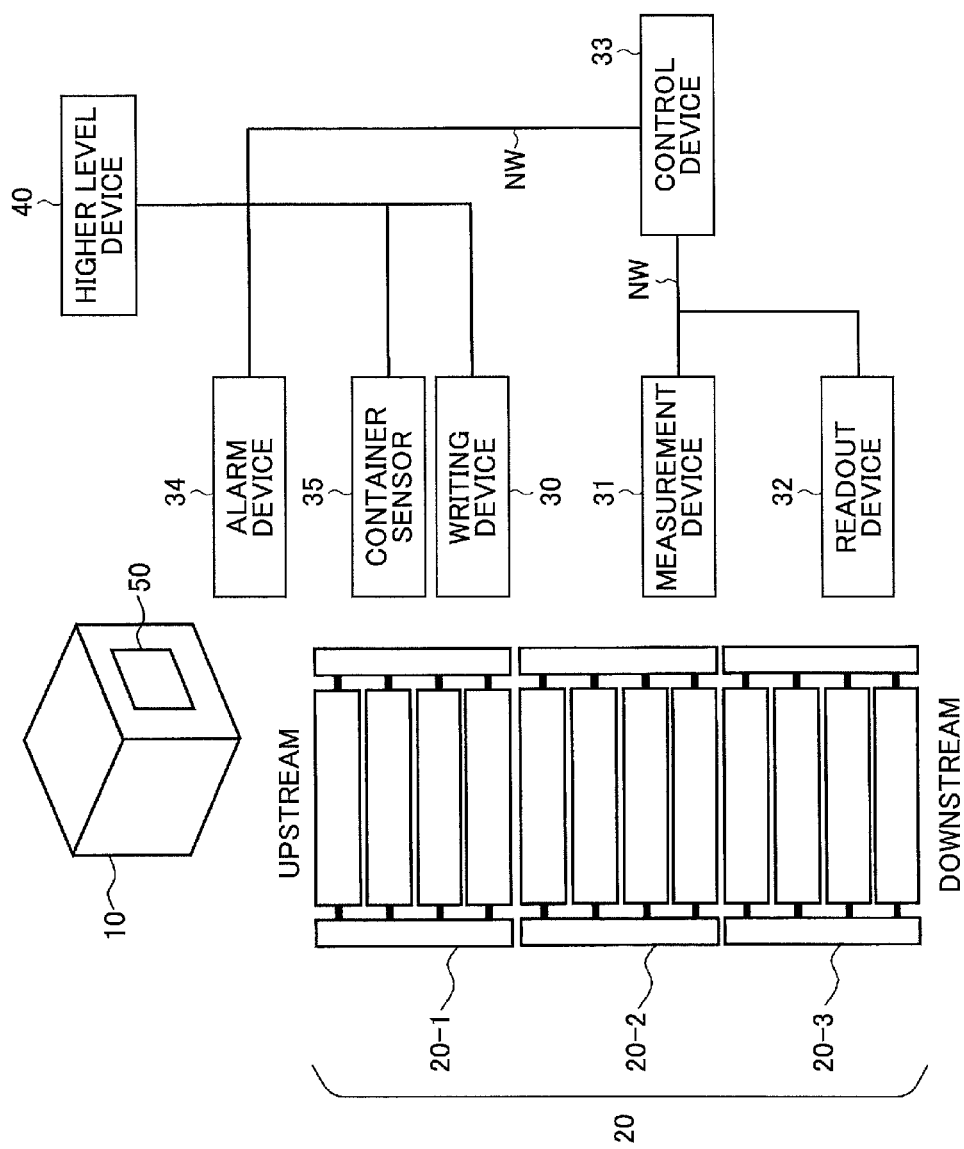
FIG. 1 is an explanatory diagram illustrating an example of a schematic configuration of a physical distribution management system according to a first embodiment.

FIG. 1 is an explanatory diagram illustrating a configuration of a physical distribution management system according to a first embodiment. The physical distribution management system is a system that can detect an error in an input sequence by size, which is one of errors in an input sequence by type for a container 10 input to a conveyer 20. The physical distribution management system includes a writing device 30, a measurement device 31, a readout device 32, a control device 33, an alarm device 34, a container sensor 35 and a higher level device 40.

The conveyer 20 as a conveyance unit can start and stop a conveyance operation and control a velocity of the conveyance operation according to the control device 33, the higher level device or a conveyer control device, which is not shown. In the present embodiment, three conveyers 20-1 to 20-3 are illustrated in sequence from an upstream side of the conveyance direction. But, also on the upstream of the conveyer 20-1 and on the downstream of the conveyer 20-3, conveyers are actually arranged. The control device 33 or the like can perform the above described control for each or the conveyers 20-1 to 20-3, individually.

The container 10 as a conveyance container has a shape of a box having a cubic or cuboid inner space. In the following explanations, regarding faces other than a bottom face, a front end and a back end in the conveyance direction are denoted as a front face and a rear face, respectively. Side faces of left and right with respect to the conveyance direction are denoted as a left side face and a right side face, respectively. Meanwhile, in the case of not distinguishing the left and right side faces, they are denoted as side faces.

To the side face of the container 10, a label 50 as an information recording medium including a rewritable type heat sensitive paper having a predetermined size (for example, an A4 size) is applied manually or the like in advance. In the present embodiment, two kinds of containers are used, heights of which are different from each other. But, the lengths (size in the conveyance direction) and the widths of the two kinds of containers are the same respectively. In the following, in order to distinguish the two kinds of containers, the container having a higher height (accordingly, a larger size) is denoted as a container 10a (See FIGS. 5A and 5B), and the container having a lower height (accordingly, a smaller size) is denoted as a container 10b (See FIGS. 5A and 5B).

The alarm device 34, the writing device 30, the measurement device 31 and the readout device 32 are arranged in this sequence from the upstream side along the conveyance direction of the conveyer 20. Moreover, in the vicinity of the writing device 30, a container sensor 35 for detecting that the container 10 is conveyed to the position of the writing device 30 is provided. Moreover, these devices and the higher level device 40 are connected to the control device 33 via a communication network NW. The communication network NW is not limited to a network among computer apparatuses such as a LAN, but includes an interface for a peripheral apparatus such as a data transmission path which is compliant with the USB, PCI or the like.

The writing device 30 as an information writing unit prints predetermined information on the label 50 applied to the container 10 which is input into the conveyer 20 by an operator and conveyed. The information to be printed (in the following, print information includes information on an article stored in the container 10, such as an address of the article or an address for delivery, and identification information including size information of the container 10. Meanwhile, a configuration of the writing device 30 and the print information will be described after in detail. The size information of the container 10 is an example of type information, which indicates a size as a type of the container 10.

The measurement device 31 as a type detection unit generates a measurement signal as a result of detecting the type, which indicates small or large (relatively larger or smaller, or larger or smaller than a predetermined size) of the size as a feature of appearance of the container (in the present embodiment, an outer size), and sends the measurement signal to the control device 33. The principle of measurement by the measurement device 31 will be explained later.

The readout device 32 as an information readout unit reads out the size information of the container 10, from the print information printed on the label 50 applied to the container 10 conveyed by the conveyer 20, and sends the size information as the readout result to the control device 33. In the present embodiment, the readout device 32 is a barcode reader.

The control device 33 controls the writing device 30, the measurement device 31, the readout device 32 and the alarm device 34. The control device 33, upon controlling the writing device 30 and instructing it to print, based on a detection output of the container sensor 35, determines whether the container 10 is conveyed at the position of the writing device 30, and instructs the printing. Moreover, the control device 33 based on the measurement signal sent from the measurement device 31 and the size information sent from the readout device 32, detects an error in input sequence by size, and sends an abnormal signal to the alarm device 34. Moreover, the control device 33, upon detecting the error in input sequence by size, can instruct the higher level device 40 to resend the print information to the writing device 30.

The alarm device 34 as an alarm unit is arranged at a position where an operator who input the container to the conveyer 20 can look and listen to the alarm device 34. When the abnormal signal from the control device 33 is received, the alarm device 34 signifies the error in input sequence by size by light or sound. That is, the alarm device 34 signifies the error in input sequence by size based on the result of detection for an error in input sequence by size by the control device 33. Specifically, the alarm device 34 is a patlamp, for example.

The container sensor is provided with a light emitting element and a light receiving element. The light emitting element and the light receiving element face each other across the conveyer 20. When light emitted from the light emitting element is intercepted by the container 10 and is not detected by the light receiving element, the container sensor detects that the container 10 is conveyed to the position of the writing device 30.

The higher level device 40 reads out the print information from an incorporated print information management table DT (See FIG. 6, which will be described later), converts it into a print command that can be interpreted by the writing device 30 and sends the print command to the writing device 30. Moreover, the higher level device 40, upon receiving an instruction for the writing device 30 to resend the print information from the control device 33, reads out from the print information management table DT the print information to be resent, converts it into a print command that can be interpreted by the writing device 30, and sends the print command to the writing device 30.

<Hardware Configuration of Control Device and Higher Level Device>

Figure 2:
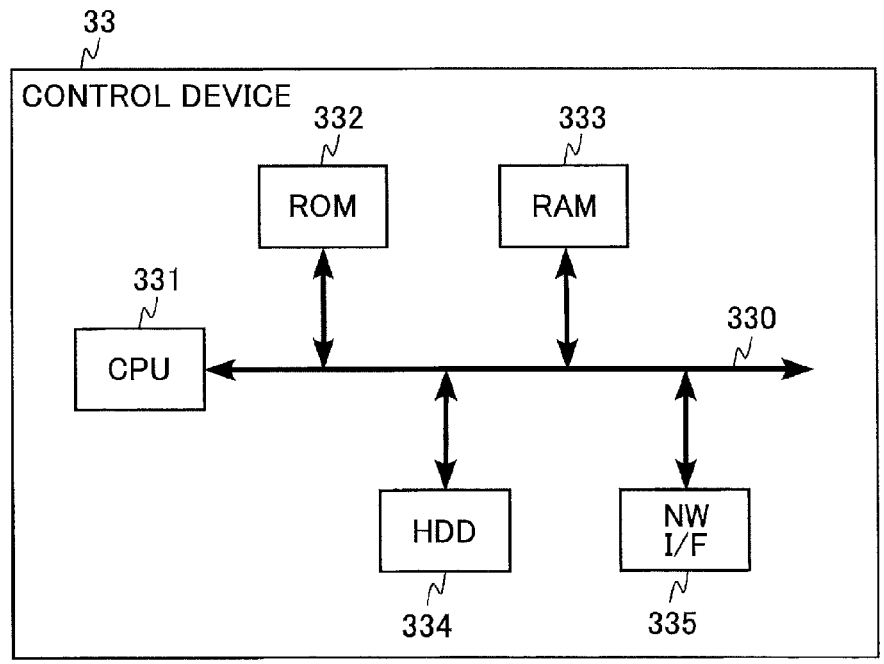
FIG. 2 is a block diagram illustrating an example of a hardware configuration of a control device in the physical distribution management system according to the first embodiment.
Figure 3:
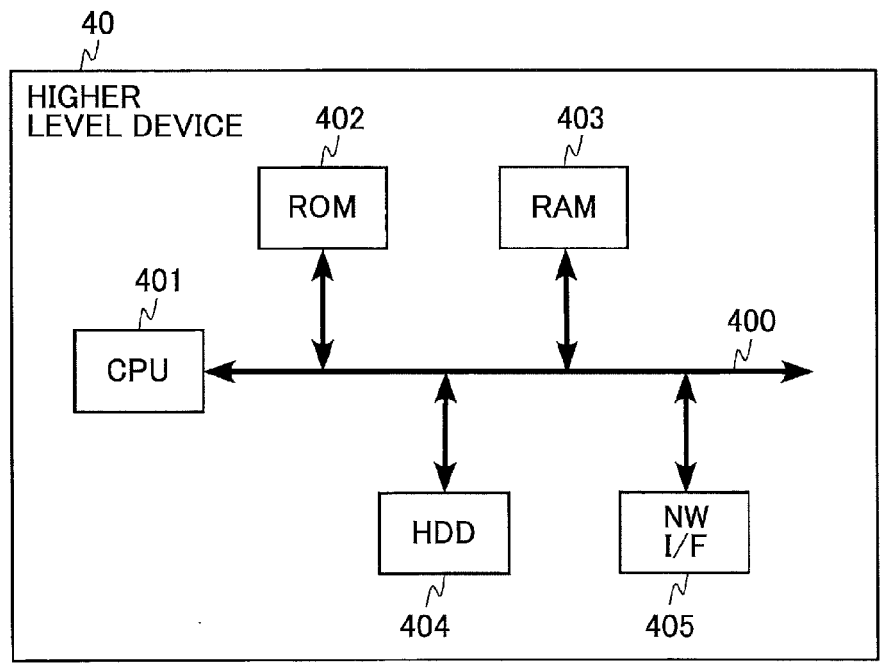
FIG. 3 is a block diagram illustrating an example of a hardware configuration of a higher level device in the physical distribution management system according to the first embodiment.

FIG. 2 is a block diagram illustrating a hardware configuration of the control device 33 in FIG. 1. FIG. 3 is a block diagram illustrating a hardware configuration of the higher level device 40 in FIG. 1.

As shown in FIG. 2, the control device 33 includes as its configuration elements, a bus 330, a CPU 331, a ROM 332, a RAM 333, a HDD (Hard Disk Drive) 334 and a NW I/F (Network Interface) 335, which are connected to the bus 330.

The CPU 331 is a processor that controls the entire control device 33. The ROM 332 is a memory that stores a boot program used by the CPU 331. The RAM 333 is a memory that becomes a work area for temporarily storing a program and data upon executing several processes. HDD 334 is a storage device that stores a large amount of programs and data, such as an operating system, a variety of control programs for physical distribution management or tables.

The NW I/F 335 is a unit to communicate with the external devices (the writing device 300, the measurement device 31, the readout device 32, the alarm device 34, the container sensor 35, or the higher level device 40) via the communication network NW. Specifically, the NW I/F 335 is a LAN card, a USE card, a PCI card or the like.

As shown in FIG. 3, the higher level device 40 includes as its configuration elements, a bus 400, a CPU 401, a ROM 402, a RAM 403, a HDD (Hard Disk Drive) 404 and a NW I/F (Network interface) 405, which are connected to the bus 400. Each of these configuration elements have the same configuration and function as the configuration element in the above-described control device 33 having the same name.

<Configuration of Writing Device>

Figure 4:
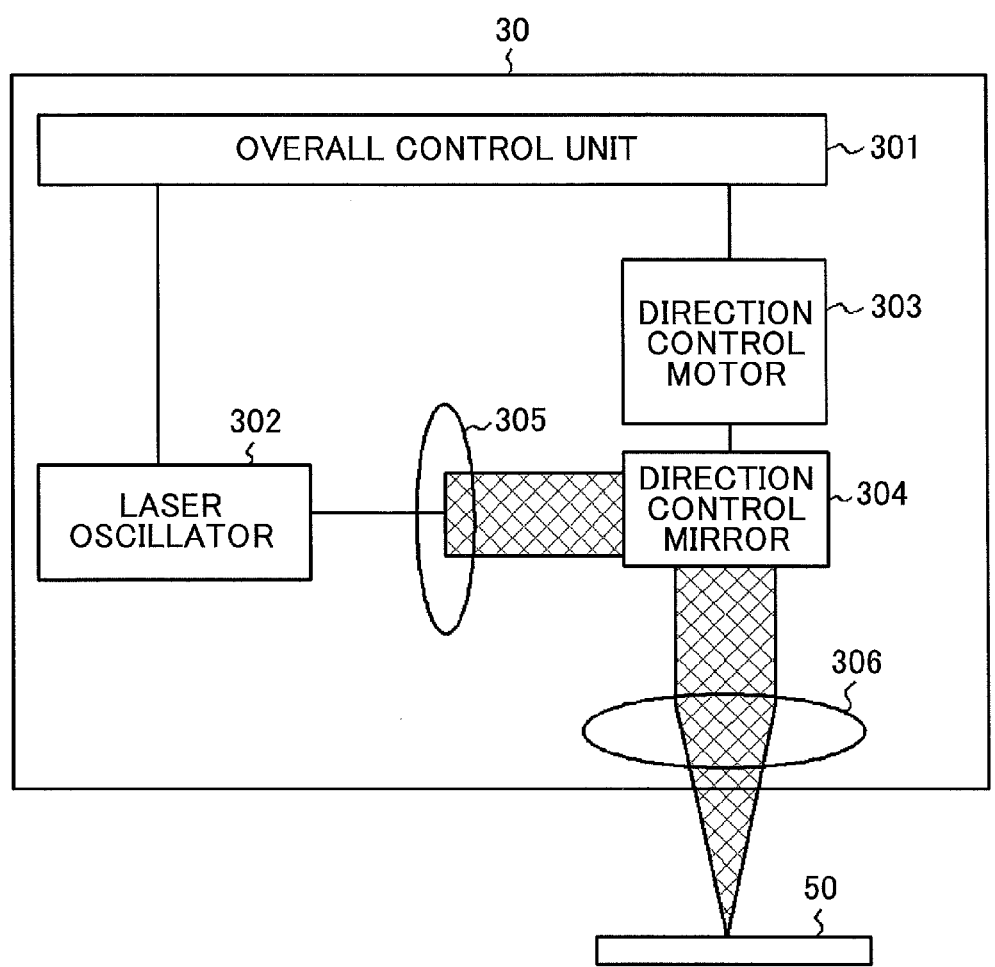
FIG. 4 is a diagram illustrating an example of a configuration of a writing device in the physical distribution management system according to the first embodiment.

FIG. 4 is a diagram illustrating a configuration of the writing device 30 in FIG. 1.

The writing device 30 is called a laser marker, and an overall control unit 301, a laser oscillator 302, a direction control motor 303, a direction control mirror 304, a spot diameter adjustment lens 305 and a focal length adjustment lens 306.

The overall control unit 301 controls each of the configuration elements of the laser marker according to the print information received from the higher level device 40, and performs a write control for writing onto the label 50 and an erasure control for erasing data written on the label 50.

Laser light generated at the laser oscillator 302 passes through the spot diameter adjustment lens 305 that enlarges the spot diameter of the laser light. Then, the direction of the laser light is adjusted by the direction control mirror 304 that controls the emission direction of the laser light called a "Galvanometer mirror". Next, a convergence position of the laser light is adjusted according to the focal length by the focal length adjustment lens 306, and the laser light converges on the surface of the label 50.

The driving of the laser light is controlled based on drawing data corresponding to the print information, therefore print on the label 50 becomes possible. That is, when the laser light is emitted, the rewritable type heat sensitive paper included in the label 50 is heated. On the heat sensitive paper, color appears by the heat, and a drawing of a character or the like becomes possible. The characters or the like drawn on the label 50 can be erased by suppressing the power of the laser light, and by widening the emission range by defocusing.

The emission position is adjusted by the overall control unit 301 moving the direction control mirror 304 via the direction control motor 303. The ON/OFF or the control of power of the laser light is performed by the overall control unit 301 controlling the laser oscillator 302. By controlling the power, a stroke width in the drawing can be changed to some extent.

<Principle of Measurement of Measurement Device>

FIGS. 5A and 5B are explanatory diagrams illustrating a principle of measurement by the measurement device 31 in FIG. 1. FIG. 5A shows a state in which a small-sized container 10b is detected. FIG. 5B shows a state in which a large-sized container 10a is detected.

The measurement device 31 is provided with a light emitting element such as a laser diode and a light receiving element such as a photo diode. For the sake of simplicity, FIG. 1 shows that the measurement device 31 is arranged on one side along the conveyance direction of the conveyer 20. But actually, the light emitting element and the light receiving element face each other on the opposite sides along the conveyance direction of the conveyer 20. Moreover, the height where the light emitting element and the light receiving element are arranged is higher than the upper end of the container 10b on the conveyer 20 and lower than the upper end of the container 10a on the conveyer 20.

The light emitting element sends measurement light L including laser light or the like at the height between the upper end of the container 10b and the upper end of the container 10a. As shown in FIG. 5A, when the container 10b reaches the position at which the measurement device 31 is arranged, the measurement light L is detected by the light receiving element without being intercepted by the container 10b. On the other hand, as shown in FIG. 5B, when the container 10a reaches the position at which the measurement device 31 is arranged, the measurement light L is intercepted by the container 10a and is not detected by the light receiving element. Accordingly, the presence or absence of the detection output by the light receiving element corresponds to the height of how high or low the container 10 is.

Meanwhile, in the present embodiment, the light emitting element and light receiving element face each other across the conveyer 20, but the present invention is not limited to this. Both the light emitting element and the light receiving element may be arranged on one side of the conveyer 20. In this configuration, the height of how high or low the container 10 is can be detected based on whether the measurement light L emitted from the light emitting element and reflected by the container 10 is detected by the light receiving element. Moreover, by providing plural pairs of light emitting element and light receiving element, plural heights can be detected.

<Schematic Operation of Physical Distribution Management System>

FIG. 6 is an explanatory diagram illustrating a schematic operation of the physical distribution management system according to the first embodiment. FIG. 6 schematically shows a flow from printing print information and reading out until finally determining an error in input sequence by size.

The print information management table DT is a table for managing information to be printed on the label 50. The print information management table DT is stored in the ROM 402 or in a recording medium in the hard disk drive 404, and includes, as the print information, a print information number, more than or equal to one content to be printed (in FIG. 6, only destination name of the content to be printed is shown), and identification information. In this embodiment, the print information number indicates the sequence of inputting the container 10 into the conveyer 20. Moreover, the identification number is composed of seven digits. The upper five digits represent an ID as print object management information connecting the container 10 to print information. The lower two digits represent an FD as the size information. For example, when the FD is "00", it indicates a small container 10b, and when the FD is "01", it indicates a large container 10a. However, the print information is not limited to this.

The higher level device 40 reads out the print information of the container 10 from the print information management table DT in the sequence of inputting into the conveyer 20, converts it into a print command that can be interpreted by the writing device 30 and sends the print command to the writing device 30. The print command includes an instruction to print the size information of the container 10 as a barcode. The writing device 30 converts the print command from the higher level device 40 into drawing data. When the container 10 reaches the position which the writing device faces, the writing device prints in a label 50 based on print instruction from the control device 33.

In the present embodiment, as print information, in addition to the "content to be printed" in the print information management table DT such as a name of a destination and an address for delivery, a barcode 51 storing "identification information" in the print information management table DT are printed. Meanwhile, in the present embodiment, the higher level device 40 specifies which information in the print information management table DT is stored in a barcode. But, the present invention is not limited to this. The writing device 30 or the control device 33 may specify it. Moreover, a two-dimensional barcode may be used instead of the barcode 51. Moreover, in the present embodiment the higher level device 40 sends the print command converted from the print information to the writing device 30, but the higher level device 40 may send the print information and the writing device 30 may interpret the print information and convert into the drawing data.

The readout device 32 reads out the barcode 51 from the label 50, and sends the readout information (readout result) RD to the control device 33. To the control device 33 the measurement result ED from the measurement device 31 is also sent.

The control device 33 compares the readout result RD and the measurement result ED, and based on a result of comparison determines whether an error in input sequence by size for the container 10 occurs. That is, the control device 33 determines an error does not occur when the readout result RD coincides with the measurement result ED, and determines an error occurs when the readout result RD does not coincide with the measurement result ED.

Figure 7:
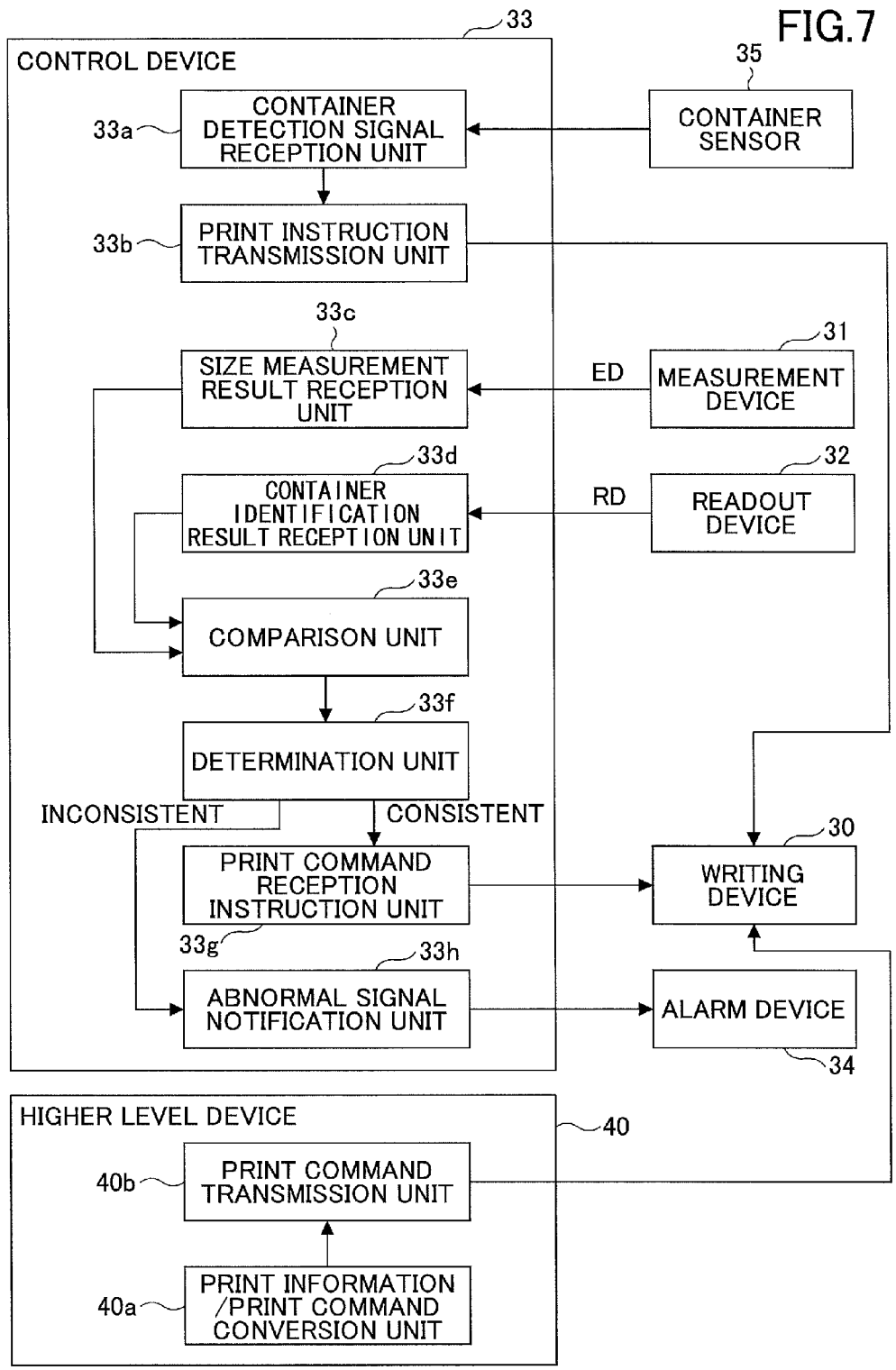
FIG. 7 is a diagram illustrating an example of functional blocks of the physical distribution management system according to the first embodiment.

FIG. 7 is a diagram illustrating functional blocks of the physical distribution management system according to the first embodiment. In these functional blocks respective units in the control device 33 correspond to functions realized by the CPU 331 in the control device 33 processing the program or data stored in the ROM 332 or the HDD 334 with the RAM 333 as a work area. Moreover, respective units in the higher level device 40 correspond to functions realized by the CPU 401 in the higher level device 40 processing the program or data stored in the ROM 402 or the HDD 404 with the RAM 403 as a work area.

The control device 33 includes a container detection signal reception unit 33a, a print instruction transmission unit 33b, a size measurement result reception unit 33c, a container identification result reception unit 33d, a comparison unit 33e, a determination unit 33f, a print command reception instruction unit 33g and an abnormal signal notification unit 33h.

The container detection signal reception unit 33a is a unit that receives a container detection signal sent from the container sensor 35 and gives notice to the print instruction transmission unit 33b that the container detection signal is received. The print instruction transmission unit 33b is a unit that, based on the notice from the container detection signal reception unit 33a, sends a print instruction to the writing device 30.

The size measurement result reception unit 33c is a unit that receives a measurement result ED sent from the measurement device 31 and outputs it to the comparison unit 33e. The container identification result reception unit 33d is a unit that receives a readout result RD sent from the readout device 32 and outputs it to the comparison unit 33e.

The comparison unit is a unit that compares the measurement result ED and the readout result RD, and outputs a comparison result to the determination unit 33f. The determination unit 33f is a unit that determines whether the measurement result ED coincides with the readout result RD. When the measurement result ED coincides with the readout result RD, the determination unit 33f gives notice to the print command reception instruction unit 33g. When the measurement result ED does not coincide with the readout result RD, the determination unit 33f gives notice to the abnormal signal notification unit 33h. The determination unit 33f functions as an error detection unit according to the present invention.

The print command reception instruction unit 33g is a unit that instructs the writing device 30 to receive a print command. The abnormal signal notification unit 33h is a unit that gives notice to the alarm device 34 of an abnormal signal.

The higher level device 40 includes a print information/print command conversion unit 40a and a print command transmission unit 40b. The print information/print command conversion unit 40a is a unit that converts print information into a print command. The print command transmission unit 40b is a unit that sends the print command to the writing device 30.

<Operation of Physical Distribution Management System>

Figure 8:
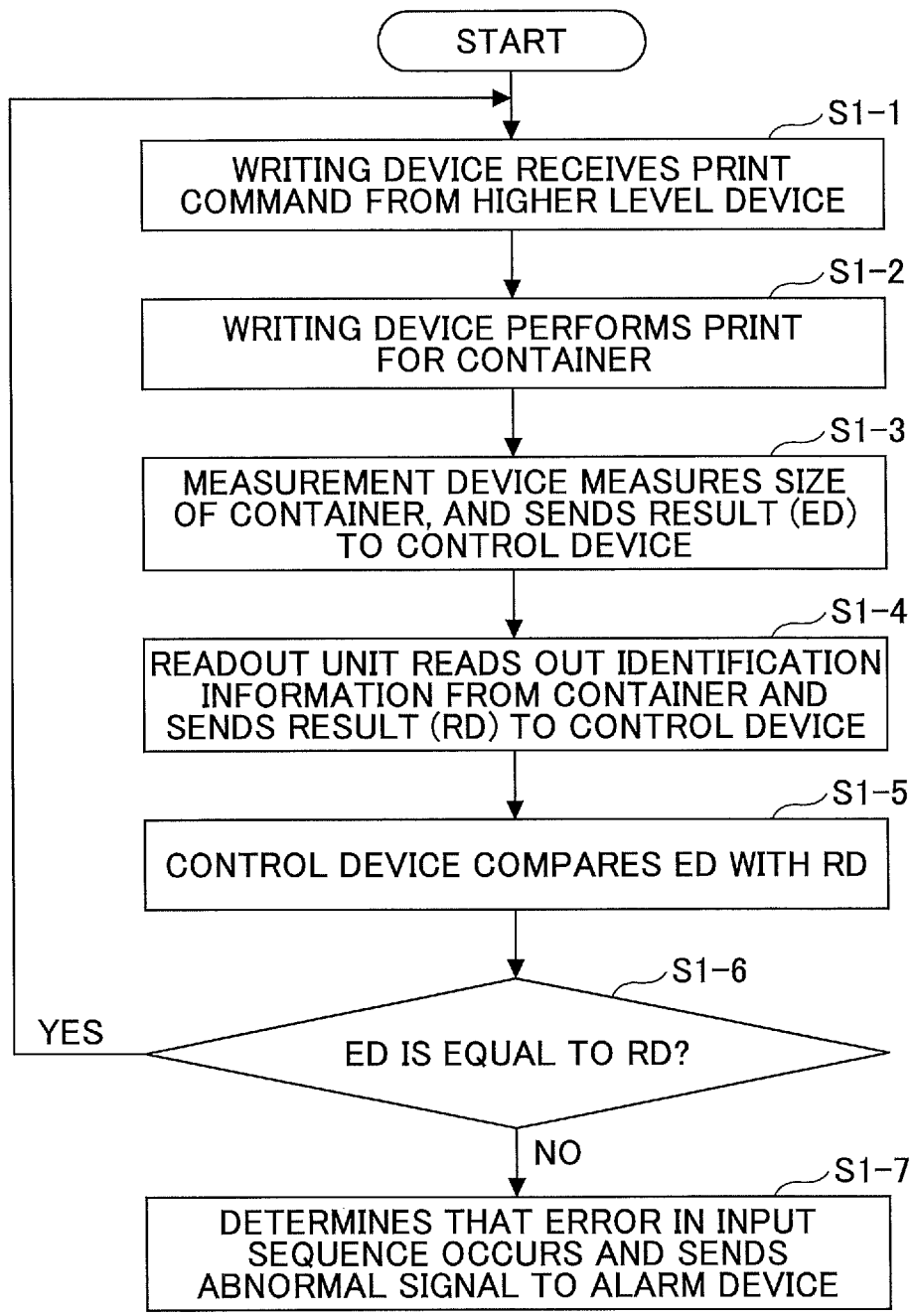
FIG. 8 is a flowchart illustrating an example of an operation of the physical distribution management system according to the first embodiment.

FIG. 8 is a flowchart illustrating an operation of the physical distribution management system according to the first embodiment. This example of operation is executed by the functional blocks shown in FIG. 7.

At first, the writing device 30 receives the print command from the higher level device 40 (step S1-1). The writing device 30 which acquires the print command at step S1-1 performs printing on a label 50 applied on the container 10 conveyed on the conveyer 20 (step S1-2: information write process).

The container 10 that completes the printing on the label 50 is conveyed to a position opposing a further downstream readout device 32, and a size is measured by the measurement device 31 (type detection process). The measurement device 31 that finishes the measurement of the size gives notice of a measurement result ED to the control device 33 (step S1-3).

The container 10 that finishes the measurement of its size is conveyed to a position opposing a further downstream readout device 32. This is a trigger for the readout device 32 to read out the identification information (barcode 51) out of the print information drawn on the label 50 (information readout process), and give notice of a readout result RD to the control device 33 (step S1-4).

Next, the control device 33 that acquires the measurement result ED of the size and a readout result RD of the barcode 51 compares the measurement result ED with the readout result RD (step S1-5), and determines whether the measurement result ED is equal to the readout result RD (step S1-6: error detection process).

When the result of determination shows that the measurement result ED is equal to the readout result RD (step S1-6: YES), it can be determined that the container of the size specified in the intended sequence is input, that is, an error in input sequence by size does not occur, and the process returns to the initial step (step S1-1) and the next container 10 is processed.

On the other hand, when the result of determination shows that the measurement result ED is not equal to the readout result RD (step S1-6: NO), it is determined that the container of the size specified in the intended sequence is not input, that is, the error in input sequence by size occurs, and an abnormal signal is sent to the alarm device 34 (step S1-7).

The alarm device 34, upon receiving the abnormal signal from the control device 33, notifies the error in input sequence by size. The operator learns of an occurrence of the error in input sequence by size for the container 10 by the notification from the alarm device 34, and performs a recovery process.

Moreover, since the present embodiment adopts a configuration of the higher level device 40 to retain the print information management table DT, the writing device 30 and the control device 33 need not retain the print information management table. For this reason, even in such a configuration thereby plural devices respective devices are operated by each other, that is, under a condition that a data type treated by each of the devices is restricted, the present mechanism can be introduced without a major change in the configuration.

At this time, not only a transmission of an abnormal notification signal to the alarm device 34, but also a halt of the conveyer 20 or an exit of a container during processing may be processed automatically. Meanwhile, the exit of the container means interrupting the work during printing by the writing device 30 or during measuring by the measurement device 31, and making the container exit from a work area.

The reason why the automatic halt of the conveyer 20 or the automatic exit of the container during processing is performed is that when a specific abnormality occurs on a conveyer line, for the purpose of having no influence on processes after that, not only the container in which the abnormality occurs but also a process of a predetermined number of containers before and after the container are often necessary to be redone.

Second Embodiment

According to the first embodiment, as described above, the error in input sequence by size of the container 10 can be detected correctly. However, after the error is detected, the conveyer line or the like is required to be restored promptly.

Since a sequence of inputting or a sequence of printing of the container 10 is generally managed by the higher level device 40, not only re-inputting the container in which the error is detected or re-printing, but also rewriting the print information for a predetermined number of containers from the container in which the error is detected (Generally, containers input after the container in which the error is detected) are required. This is because in the case of printing and re-inputting only the container 10 in which the error is detected, the sequence of inputting the containers 10 may be changed.

For example, assume the system in which containers are expected to be input in the sequence of A, B, C, D and E. Meanwhile, these reference signs A to E are identification information for the respective containers (print object management information), and are stored in the barcode 51 drawn in the label 50.

In the case where an error in input sequence in container C is detected, and only the container C is re-input, the sequence of input after the restoration from the error is C, A, B, D and E. On the other hand, in the downstream system from the position where the error is detected, it is expected that the containers are input in the sequence of A, B, C, D and E. Accordingly, in the case of detecting the container B is detected next to the container D, the container C is determined to be absent, and also in the downstream processing an error is considered to occur again. Accordingly, in the case where an error is detected in the container C, it is a general method for re-inputting including the containers A and B input after the container C and maintaining the sequence.

Accordingly, in case of re-inputting containers in his way, for printing information to be printed for each of the containers, information which is adjusted to the container to be input must be selected. Therefore, in general, the operator may check the print information printed on the label on the container to be re-input, and search for print information which coincides with the checked printed print information in the screen of the writing device 30, the control device 33, the higher level device 40 and the like, and issue a print instruction. However, selecting the print information by the operator, as above, requires trouble and time for checking by the operator, and a human-induced selection mistake may occur.

Accordingly, by a physical distribution management system according to the second embodiment, which will be explained below, the above problem is solved.

<Functional Blocks of Physical Distribution Management System>

Figure 9:
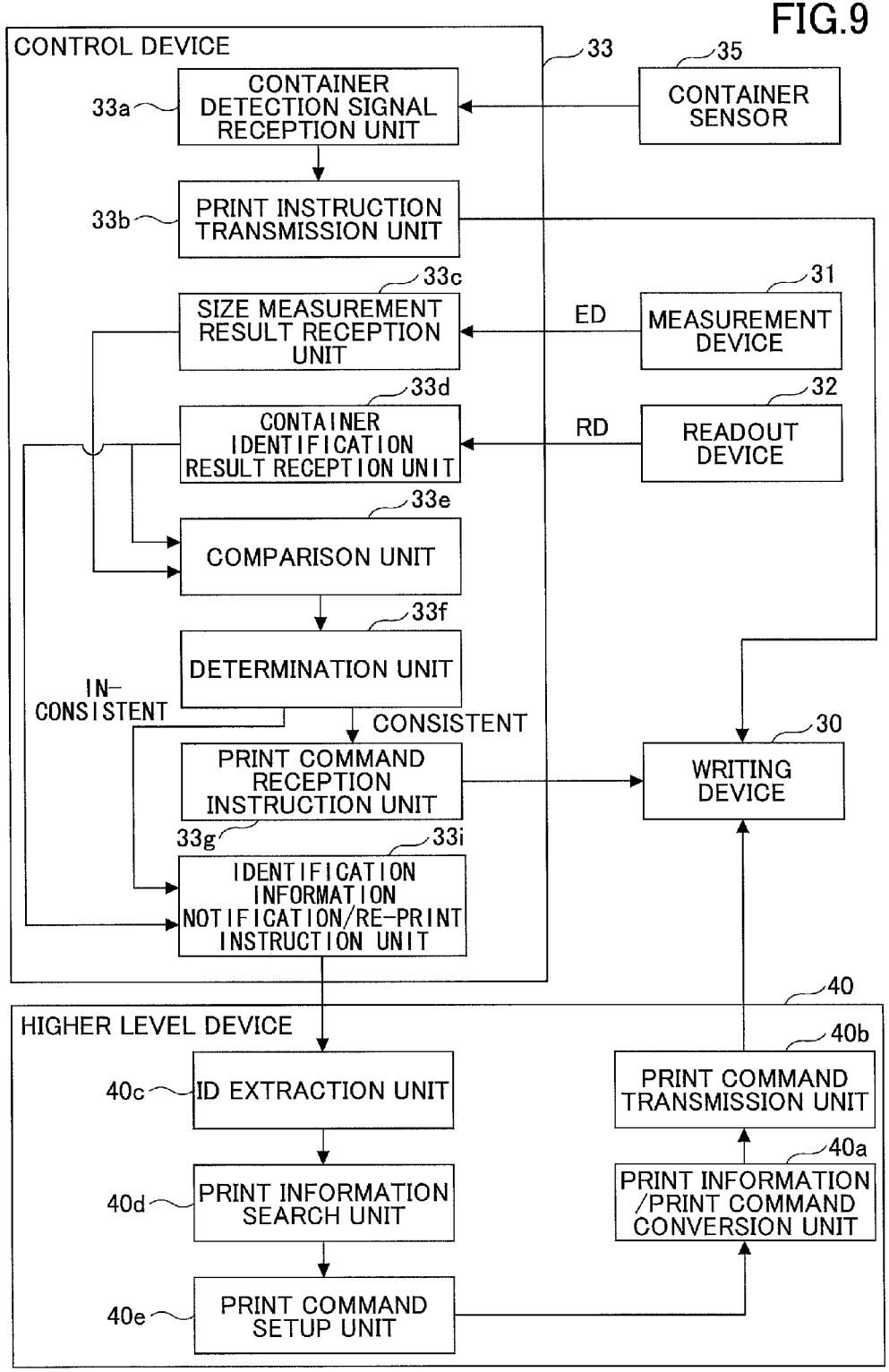
FIG. 9 is a diagram illustrating an example of functional blocks of the physical distribution management system according to a second embodiment.

FIG. 9 is a diagram illustrating functional blocks of the physical distribution management system according to the second embodiment. In this drawing, to the member which is the same as or corresponds to the member in FIG. 7 (functional blocks of the physical distribution management system according to the first embodiment) the same reference numeral as in FIG. 7 is assigned, and an explanation thereof will be omitted. Moreover, since a schematic configuration of the physical distribution management system, a hardware configuration of the control device, a hardware configuration of the higher level device, a configuration of the writing device and the measurement principle of the measurement device according to the present embodiment are the same as those in the first embodiment, explanations thereof will be omitted.

As shown in FIG. 9, the control device 33 is not provided with the abnormal signal notification unit 33h with which the control device 33 in FIG. 7 is provided, but is provided with an identification information notification/re-print instruction unit 33i with which the control device 33 in FIG. 7 is not Provided. Moreover, the higher level device 40 has a configuration of appending an ID extraction unit 40c, a print information search unit 40d and a print command setup unit 40e to the higher level device 40 in FIG. 7.

The identification information notification/re-print instruction unit 33i is a unit that, when the determination result by the determination unit 33f is "inconsistent", gives notice of the readout result RD received by the container identification result reception unit 33d to the ID extraction unit 40c in the higher level device 40 with a re-print instruction.

The ID extraction unit 40c is a unit that extracts the print object management information ID from the readout result RD notified from the identification information notification/re-print instruction unit 33i. The print information search unit 40d is a unit that searches from the print information management table DT print information having an ID which coincides with the print object management information ID extracted by the ID extraction unit 40c, and specifies it. The print command setup unit 40e is a unit that sets the print information specified by the print information search unit 40d for the print information/print command conversion unit 40a.

<Operation of Physical Distribution Management System>

Figure 10:
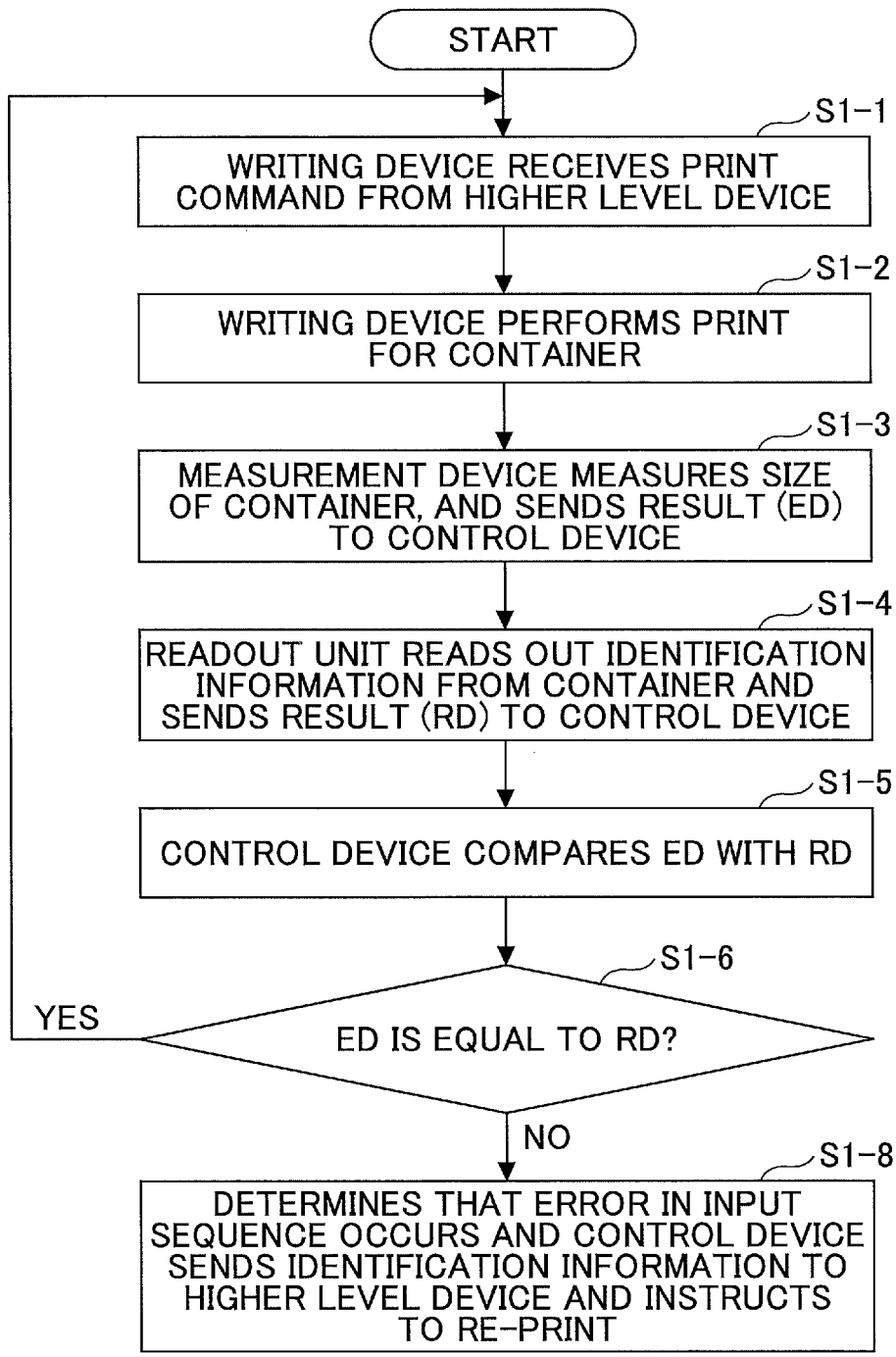
FIG. 10 is a flowchart illustrating an example of an operation of the physical distribution management system according to the second embodiment.
Figure 11:
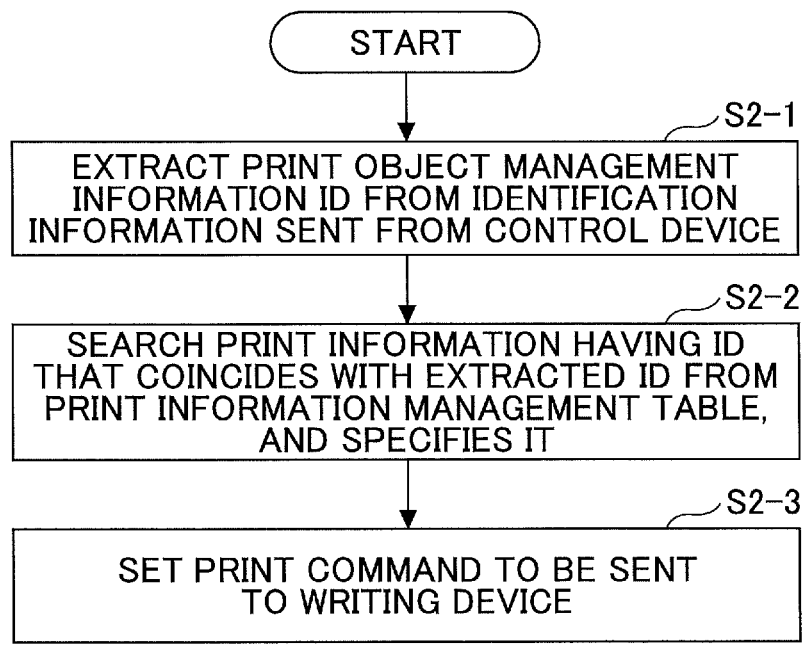
FIG. 11 is a flowchart illustrating an example of an operation of a higher level device in the physical distribution management system according to the second embodiment.

FIG. 10 is a flowchart illustrating an operation of the physical distribution management system according to the second embodiment. FIG. 11 is a flowchart illustrating an operation of the higher level device in the physical distribution management system according to the second embodiment. In FIG. 10, to the same step as the step in FIG. 8 (the operation of the physical distribution management system according to the first embodiment) the same reference numeral (step number) as that in the FIG. 8 is assigned. This operation is executed by the functional blocks shown in FIG. 9.

In this drawing, steps S1-1 to S1-8 are the same as in FIG. 8, and an explanation thereof will be omitted. Moreover, a process in the case where at step S1-6 the measurement result ED is equal to the readout result RD is the same as that in FIG. 8, and the explanation will be omitted.

On the other hand, when at step S1-7 the measurement result ED is not equal to the readout result RD, the next process S1-8 is different from that in FIG. 8. These processes are processes for automatically selecting print information to be re-input after detecting the error in input sequence by size for the container 10.

At step S1-8, the control device 33, in the case where it is determined that the measurement result ED is not equal to the readout result RD, determines that the error in input sequence by size occurs, and gives notice of the identification information (readout result RD) readout from the label 50 of the container 10 in which the error in input sequence by size is detected to the higher level device 40 with the re-print instruction. Here, as the identification information, not only the size information FD but also the print object management information ID which connects the container 10 with the print information are notified. That is, the control device 33 functions as a re-write instruction unit.

In the higher level device 40, at first, from the identification information notified from the control device 33 a print object management information ID is extracted (step S2-1). Print information having information that coincides with the extracted ID is searched from the print information management table DT which the higher level device 40 retains inside, and specifies it (step S2-2). Next, from the print information a print command to be sent to the writing device 30 is set (step S2-3). That is, the higher level device 40 functions as a writing information rearrangement unit.

By passing through steps S1-8 and S2-1 to S2-3, as described above, the print process for print information after the detection of the error restarts from the print information for the container 10 which the error is detected, and operator can restart the print process without selecting print information.

In this way, according to the physical distribution management system of the second embodiment, without the operator going to trouble after the detection of the error, by automatically selecting print data to be re-input, the restoration process can be performed smoothly.

Meanwhile, also in the present embodiment, in the same way as the first embodiment (FIG. 7), the abnormal signal notification unit 33h may be provided so as to give notice of an abnormal signal to the alarm device 34. Moreover, it may be configured so as to perform at least one of the rewriting and the rearrangement of the transmission sequence. That is, since the rewriting is executed under the operator's determination by an other system (device) or the like, the rewriting is not automatically performed in this system. However, in order to determine whether to perform the rewriting, the arrangement of the transmission sequence of the print data and the transmission are performed. That is, in order to display failed data tentatively on a screen of an application, the failed data are sent (arrangement of transmission sequence of print data and transmission).

Third Embodiment

In the physical distribution system according to the first embodiment and the physical distribution system according to the second embodiment, as described above, after printing identification information on a container, a presence of an error in input sequence by size of the container is determined. On the other hand, a physical distribution management system according to a third embodiment has a feature of determining a presence of an error in input sequence by size of a container before printing identification information on the container.

<Configuration of Physical Distribution Management System>

Figure 12:
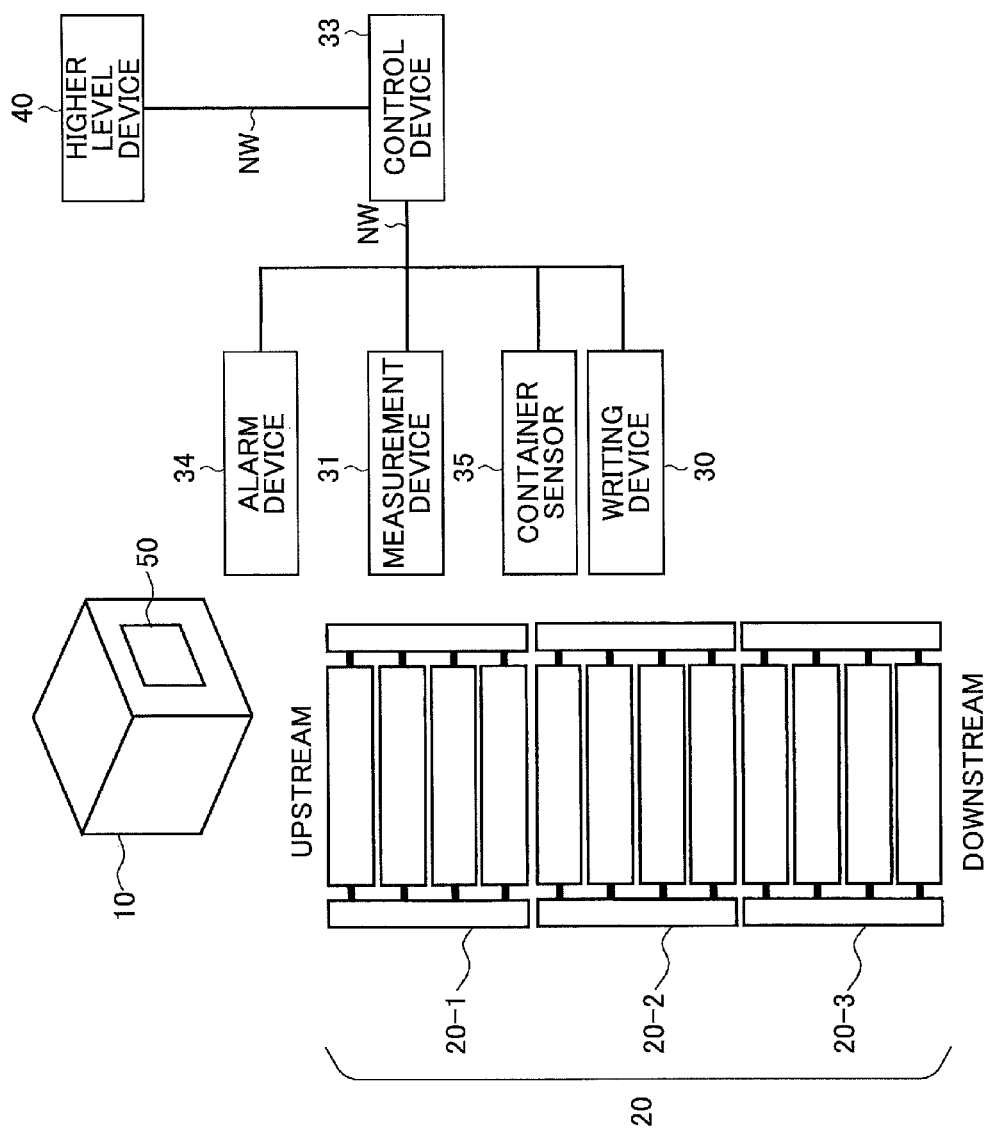
FIG. 12 is an explanatory diagram illustrating an example of a schematic configuration of a physical distribution management system according to a third embodiment.

FIG. 12 is an explanatory diagram illustrating a schematic configuration of the physical distribution management system according to the third embodiment. In this drawing, to the member which is the same as or corresponds to the member in FIG. 1 (schematic configuration of the physical distribution management system according to the first embodiment) the same reference numeral as in FIG. 1 is assigned, and an explanation thereof will omitted.

The physical distribution management system according to the present embodiment includes a writing device 30, a measurement device 31, a control device 33, an alarm device 34, a container sensor 35 and a higher level device 40. Different from the physical distribution management system according to the first embodiment, the physical distribution management system according to the present embodiment is not provided with a readout device, and the writing device 30 and the container sensor 35 are arranged on a downstream side of the measurement device 31 in the transporting direction of the conveyer 20.

Since respective hardware configurations of the control device 33 and the higher level device 40 are the same as the hardware configurations of the control device 33 and the higher level device 40 according to the first embodiment (FIGS. 2 and 3), drawings and explanations will be omitted. On the other hand, respective functional configurations (functional block diagrams) of the control device 33 and the higher level device 40 are different from those in the first embodiment. In these functional configurations, before printing identification information on the container 10 a presence of an error in input sequence by size of the container 10 is determined. Respective devices are operated so that when the error is absent, the printing is performed, and when the error is present, the printing is not performed. These functional configurations will be described later.

<Schematic Operation of Control Device>

Figure 13:
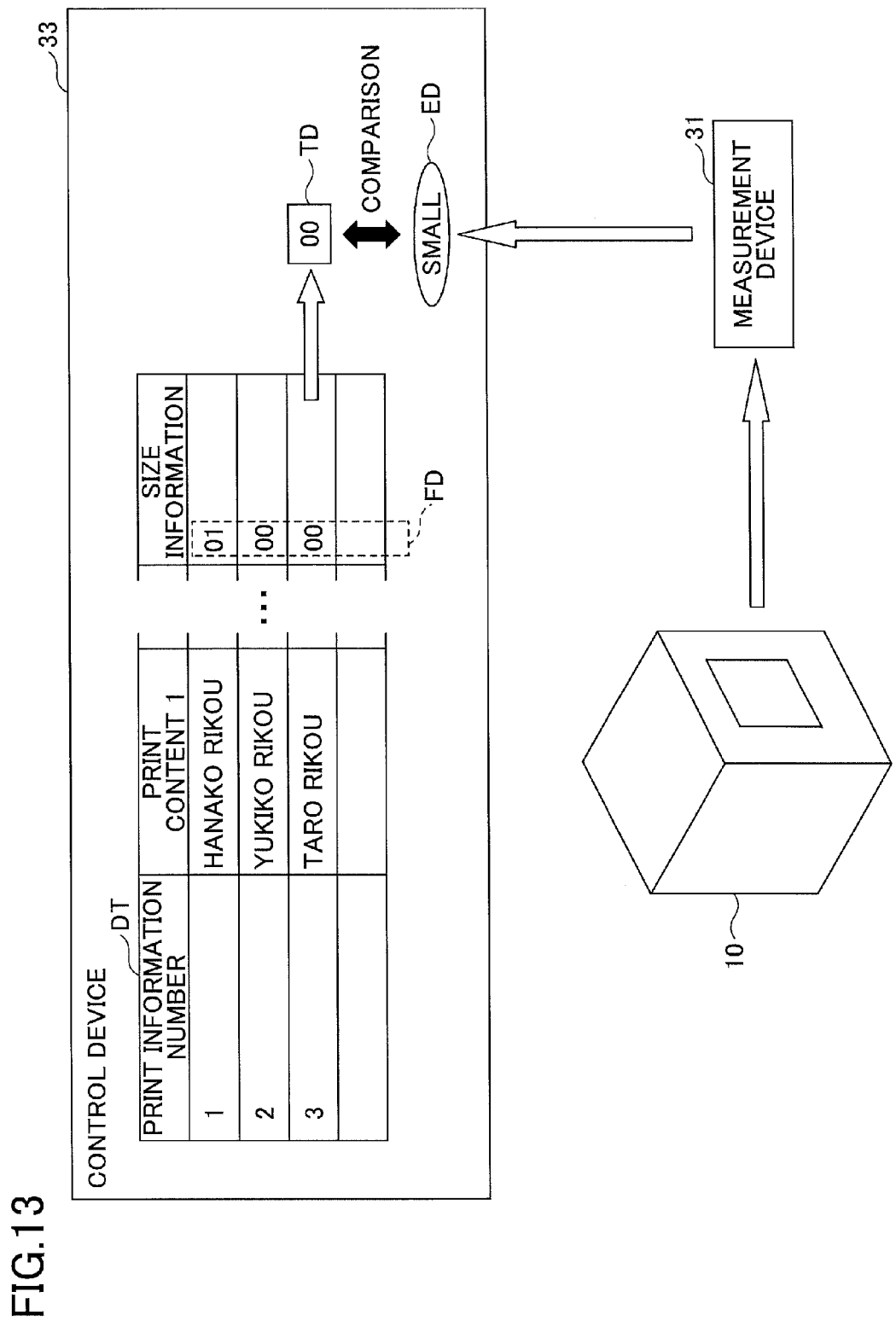
FIG. 13 is an explanatory diagram illustrating an example of a schematic operation of a control device in the physical distribution management system according to the third embodiment.

FIG. 13 is an explanatory diagram illustrating a schematic operation of the control device in the physical distribution management system according to the third embodiment.

In the present embodiment, the print information management table DT includes a print information number, greater than or equal to one content to be printed, and size information ED, which may be included or may not to be included in the print content. However, the present invention is not limited to this practically.

The treatment of the size information ED in the present embodiment is the same as in the first embodiment (See FIG. 6). That is, the treatment of the size information ED is a treatment such that when ED is "00", it indicates a small container 10b, when ED is "01", it indicates a large container 10a.

Meanwhile, the size information ED is not necessary to be independent as size information, and may be managed as a part of the identification information (not shown), which associates the container 10 as a print object with the print information, or as a part of other print content.

The control device 33 compares the measurement result ED acquired from the measurement unit 31 with the size information DE of the print information to be printed. As a result of comparison, in the case where the measurement result ED coincides with the readout result RD, it is regarded that an error in input sequence does not occur. In this case, the control device 33, after converting the print information into a command that the writing device 30 can interpret, sends a print command to the writing device 30, thereby instructs the writing device 30 to perform printing for the label 50 applied to the container 10 based on the print information. As the result of comparison, in the case where the measurement result ED does not coincide with the readout result RD, it is regarded that the error in input sequence occurs, and the control device 33 instructs the writing device 30 not to perform printing.

<Schematic Operation of Physical Distribution Management System>

Figure 14:
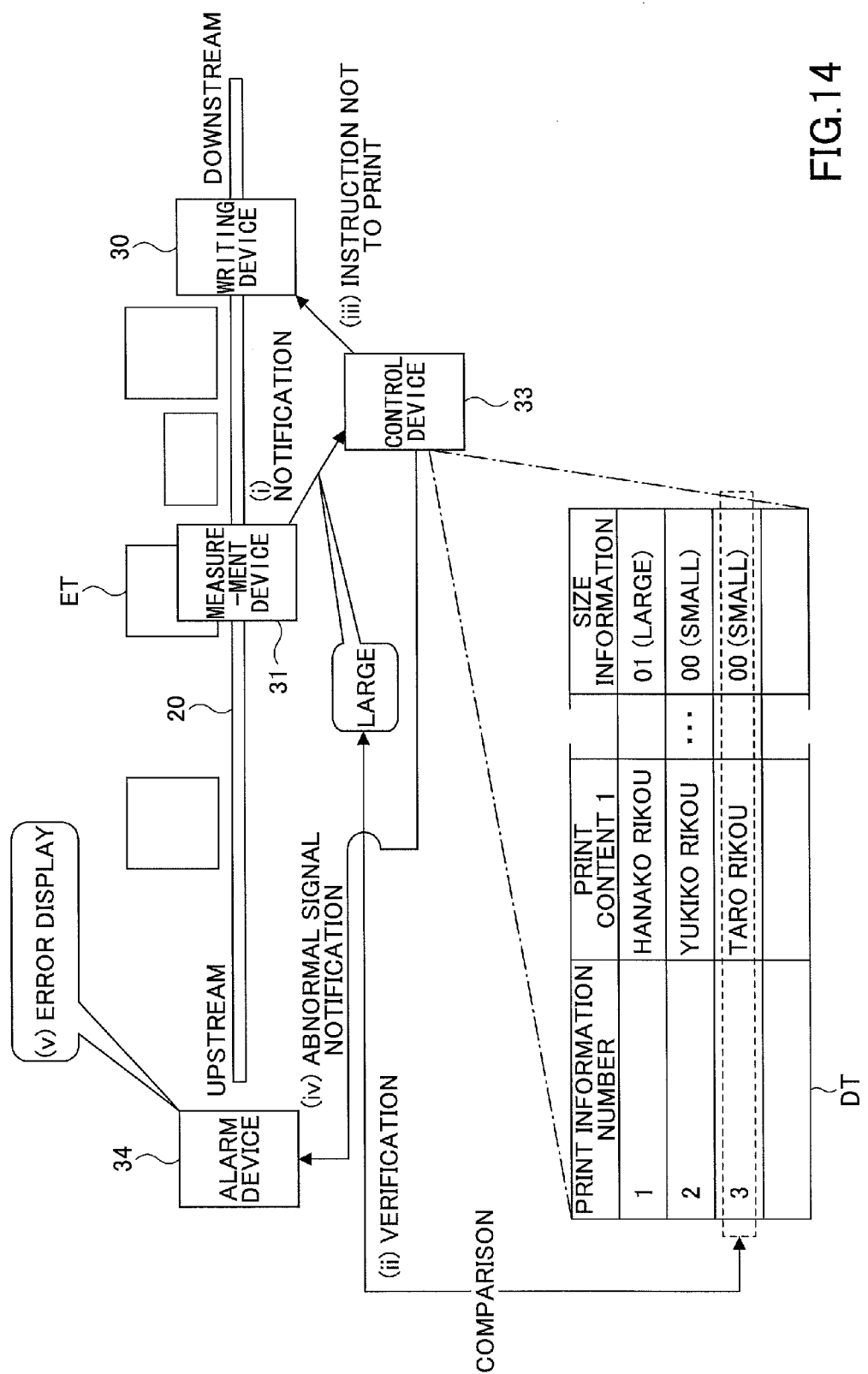
FIG. 14 is an explanatory diagram illustrating an example of a schematic operation of the physical distribution management system according to the third embodiment.

FIG. 14 is an explanatory diagram illustrating a schematic operation of the physical distribution management system according to the third embodiment.

At first, the measurement device 31 performs a size measurement for the container 10 which reaches the front of the measurement device 31, and gives notice of a result of measurement ED to the control device 33 ((i) notification). The measurement result ED to be transmitted may be anything as long as the control device 33 can interpret it.

The control device 33 compares the received result of measurement ED with the size information ED acquired from the print information management table DT incorporated in the control device 33, and determines whether the result of the measurement ED coincides with the sized information FD ((i) verification).

The control device 33, upon determining that the measurement result ED coincides with the size information FD, instructs the writing device 30 to print. On the other hand, when the control device 33 determines that the measurement result ED does not coincide with the size information FD, the control device 33 instructs the writing device 30 not to perform printing ((iii) instruction not to print). In this figure, regarding the container ET, the measurement result ED is "large" and the size information FD is "small", and an operation when it is determined that the measurement result ED does not coincide with the size information FD is shown.

Here, the instruction not to print is, for example, a procedure of executing a command that stops printing or sending an error code to the writing device 30, or of not sending print data to the writing device 30 thereby making the writing device 30 in a state of not performing printing or the like.

When the control device 33 instructs the writing device 30 not to print, the control device 33 gives notice of an abnormal signal to the alarm device 34 ((iv) abnormal signal notification). The alarm device 34, according to the received abnormal signal, performs an error display ((v) error display).

<Functional Block in Physical Distribution Management System>

Figure 15:
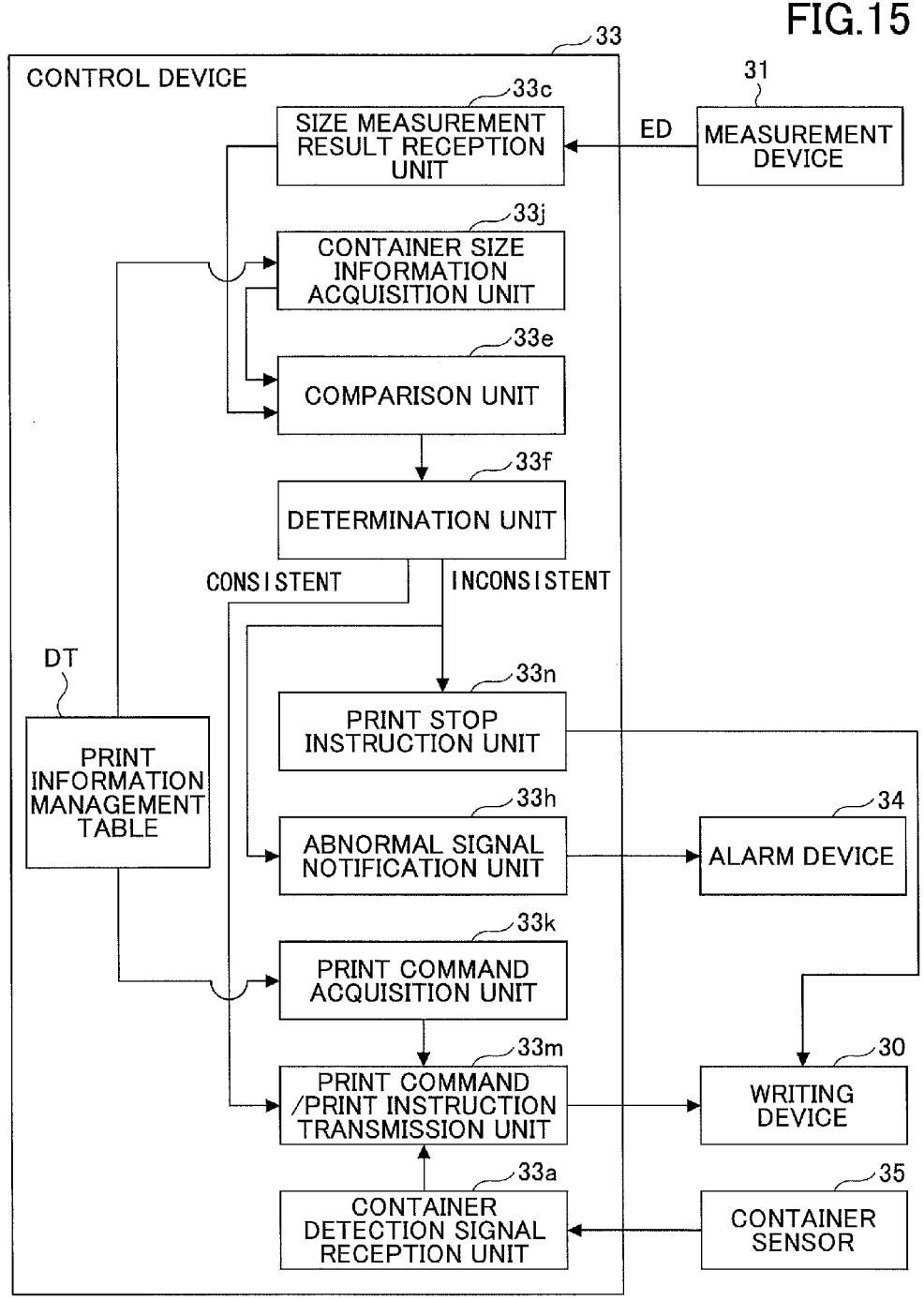
FIG. 15 is a diagram illustrating an example of functional blocks of the physical distribution management system according to the third embodiment.

FIG. 15 is a diagram illustrating functional blocks of the physical distribution management system according to the third embodiment. In this drawing, to the member which is the same as or corresponds to the member in FIG. 7 (functional blocks of the physical distribution management system according to the third embodiment) the same reference numeral as in FIG. 7 is assigned.

The control device 33 includes a container detection signal reception unit 33a, a size measurement result reception unit 33c, a comparison unit 33e, a determination unit 33f, an abnormal signal notification unit 33h, a container size information acquisition unit 33j, a print command acquisition unit 33k, a print command/print instruction transmission unit 33m, a print stop instruction unit 33n and a print information management table DT.

The container detection signal reception unit 33a is a unit that receives a container detection signal sent from the container sensor 35, and gives notice of reception of the container detection signal to the print command/print instruction transmission unit 33m.

The container size information acquisition unit 33j is a unit that acquires size information FD from the print information management table DT. The print command acquisition unit 33k is a unit that acquires print information from the print information management table DT and converts it into a print command, thereby it acquires the print command.

A size measurement result reception unit 33c, a comparison unit 33e, a determination unit 33f and an abnormal signal notification unit 33h have the same functions as the units in FIG. 7 which have the same names, respectively. However, the comparison unit 33e in FIG. 7 compares the measurement result ED from the size measurement result reception unit 33c, with the readout result RD from the container identification result reception unit 33d. On the other hand, the comparison unit 33e according to the present embodiment compares the measurement result ED from the size measurement result reception unit 33c with the size information FD from the container size information acquisition unit 33j, which is different from the comparison unit 33e in FIG. 7.

The print command/print instruction transmission unit 33m is a unit that in the case where a determination result by the determination unit 33f is "consistent", when a detection signal is sent from the container detection signal reception unit 33a, sends a print command and print instruction to the writing device 30. The print stop instruction unit 33n is a unit that when the determination result by the determination unit 33f is "inconsistent", instructs the writing device 30 to stop printing.

<Operation of Physical Distribution Management System>

Figure 16:
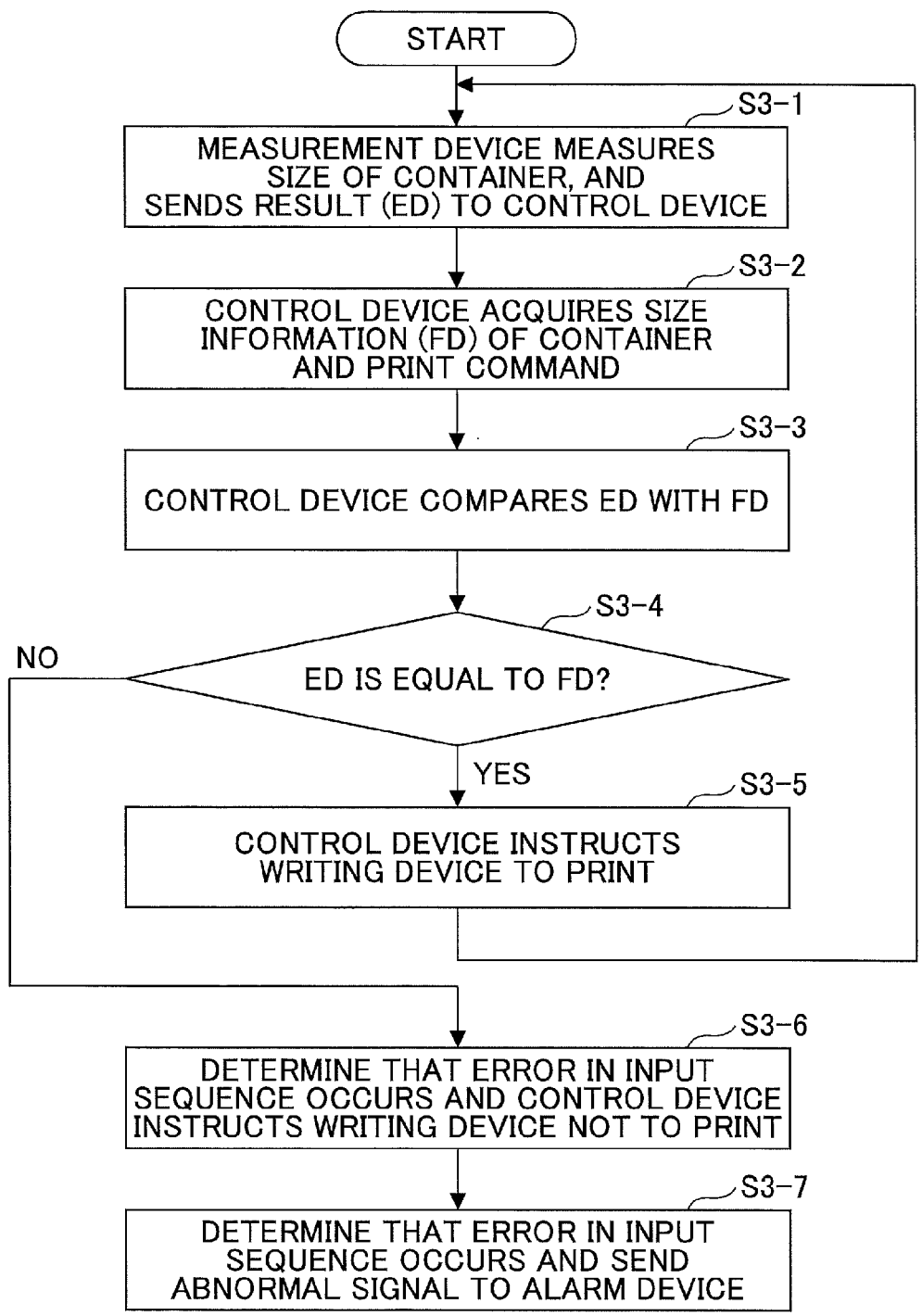
FIG. 16 is a flowchart illustrating an example of an operation of the physical distribution management system according to the third embodiment.

FIG. 16 is a flowchart illustrating an operation of the physical distribution management system according to the third embodiment. This operation is executed by the functional blocks shown in FIG. 15.

At first, the measurement device 31 measures a size of the container 10 which reaches the front of the measurement device 31, and gives notice of a result of measurement ED to the control device 33 (step S3-1). The control device 33, after receiving the measurement result ED, acquires size information FD from the print information management table DT incorporated in the control device 33 and converts print information read out from the print information management table DT into a print command, thereby it acquires the print command (step S3-2).

Next, the control device 33 compares the measurement result ED with the size information FD (step S3-3), and determines whether the measurement result ED is equal to the size information ED (step S3-4). When the measurement result ED is equal to the size information ED (step S3-4: YES), it is determined that the container 10 of the specified size is input in the sequence as intended, and the control device 33 instructs the writing device 30 to print (step S3-5). Then, the process returns to the initial step S3-1, and the next container 10 is processed.

The control device 33, when the measurement result ED is not equal to the size information ED (step S3-4: NO), it is determined that the container 10 of the specified size is not input in the sequence as intended, that is, an error in input sequence, and instructs the writing device 30 not to print (step S3-6). Next, the control device 33 sends an abnormal notification signal to the alarm device 34 (step S3-7).

By executing the flows as described above, before performing printing for the container 10, an error in input sequence can be detected. According) when the conveyance system is restarted by the operator, it is not necessary for the writing device 30 to change the sequence of printing for the container 10, and the above flows can start from print information which is finally acquired (print information when the error in input sequence is detected).

Moreover, since before performing printing for the container 10 an input sequence of which an error can be detected, even in the case where an upper limit number of writing is restricted, wasting the number of writings can be prevented.

Meanwhile, in the above flow, the size measurement (step S3-1) by the measurement device 31 is performed before the control device 33 performing process of acquiring the size information FD (step S3-2). However, the sequence of these processes may be reversed.

Moreover, at step S3-2 in the present embodiment, the print command and the size information FD are acquired. However, the present invention is not limited to this. A form such that the size information is embedded in the print command is possible.

Moreover, step S3-2 may be a step, at which the print command is not acquired but only the size information FD is acquired, and when the determination result at step S3-4 is "consistent" the print command is acquired.

Fourth Embodiment

By the physical distribution management system according to the third embodiment, as described above, an error in input sequence by size of the container 10 can be detected correctly, and a re-print process for re-starting from the container 10 in which the error in input sequence occurs can be performed. Here, after detecting the error, a prompt restoration for the conveyer line is preferable. Furthermore, an amount of processing for re-starting after the restoration is preferably small.

However, since in the physical distribution management system according to the third embodiment, the re-print process is performed from the container 10 in which the error in input sequence occurs, as shown in FIG. 14, for example, in such a situation where an input container exists after the container ET in which the error in input sequence occurs, all containers on the upstream side of the container ET need to be singularly picked out from the conveyer 20 and re-input.

The physical distribution management system according to the fourth embodiment solves the above problem, i.e. after the detection of the error in input sequence, it is possible to pick out and re-input (re-print) only the container in which the error in input sequence occurs.

<Functional Block of Physical Distribution Management System>

Figure 17:
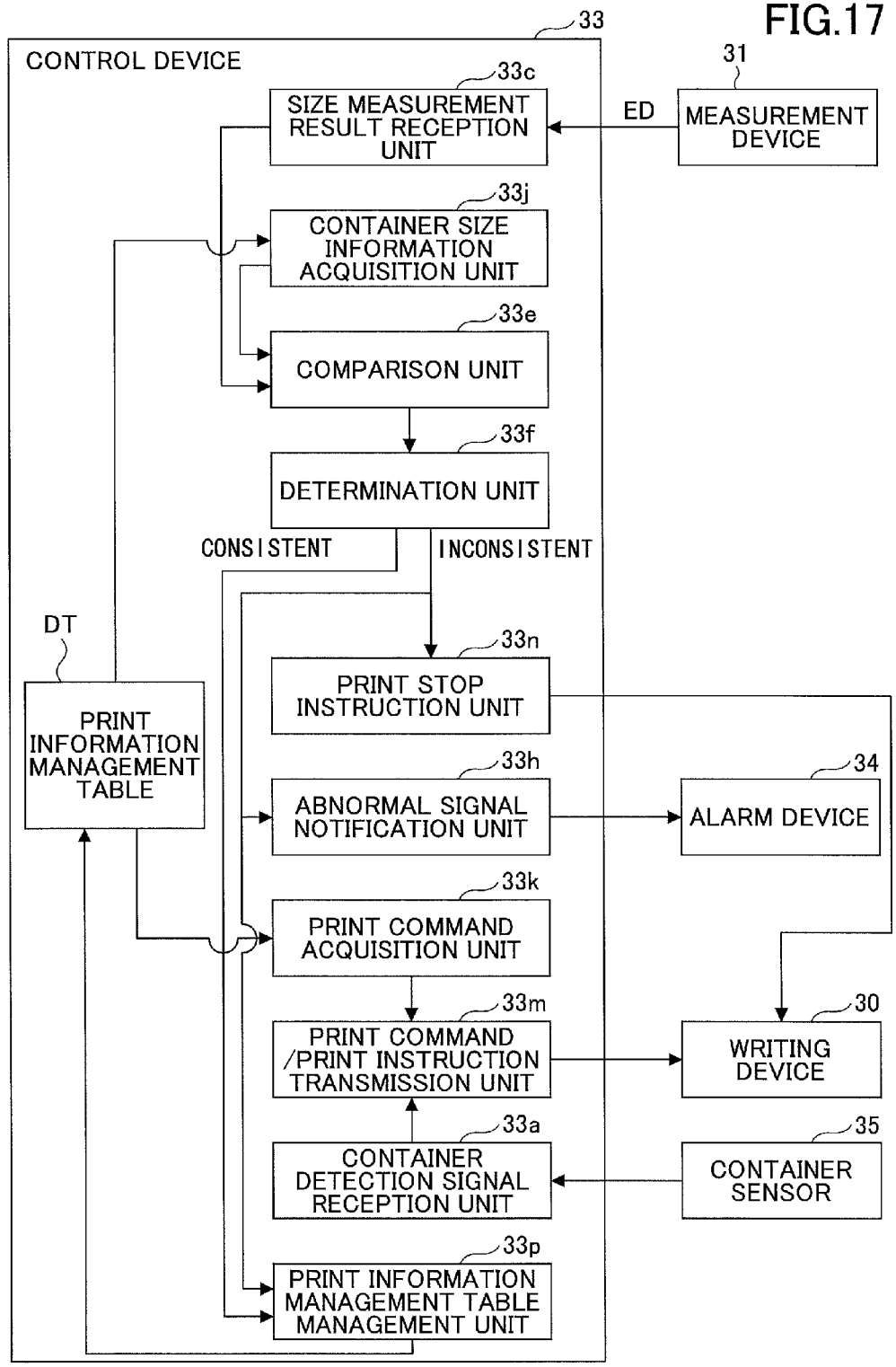
FIG. 17 is a diagram illustrating an example of functional blocks of a physical distribution management system according to a fourth embodiment.

FIG. 17 is a diagram illustrating functional blocks of the physical distribution management system according to the fourth embodiment. In this drawing, to the member which is the same as or corresponds to the member in FIG. 15 (functional blocks of the physical distribution management system according to the third embodiment) the same reference numeral as in FIG. 15 is assigned, and an explanation thereof will be omitted. Moreover, since a schematic configuration of the physical distribution management system, a hardware configuration of the control device, a hardware configuration of the higher level device, a configuration of the writing device and the like are the same as those in the third embodiment, explanations thereof will be omitted.

This control device 33 is configured so that a print information management table management unit 33$n$ is added to the control device 33 shown in FIG. 15, and the determination result of the determination unit 33$f$ is transmitted to the print information management table management unit 33$n$.

The print information management table management unit 33$p$ is a unit that manages the print information management table DT. Content of management will be described later in detail.

<Example of Operation of Physical Distribution Management System and Content of Print Information Management Table>

Figure 18:
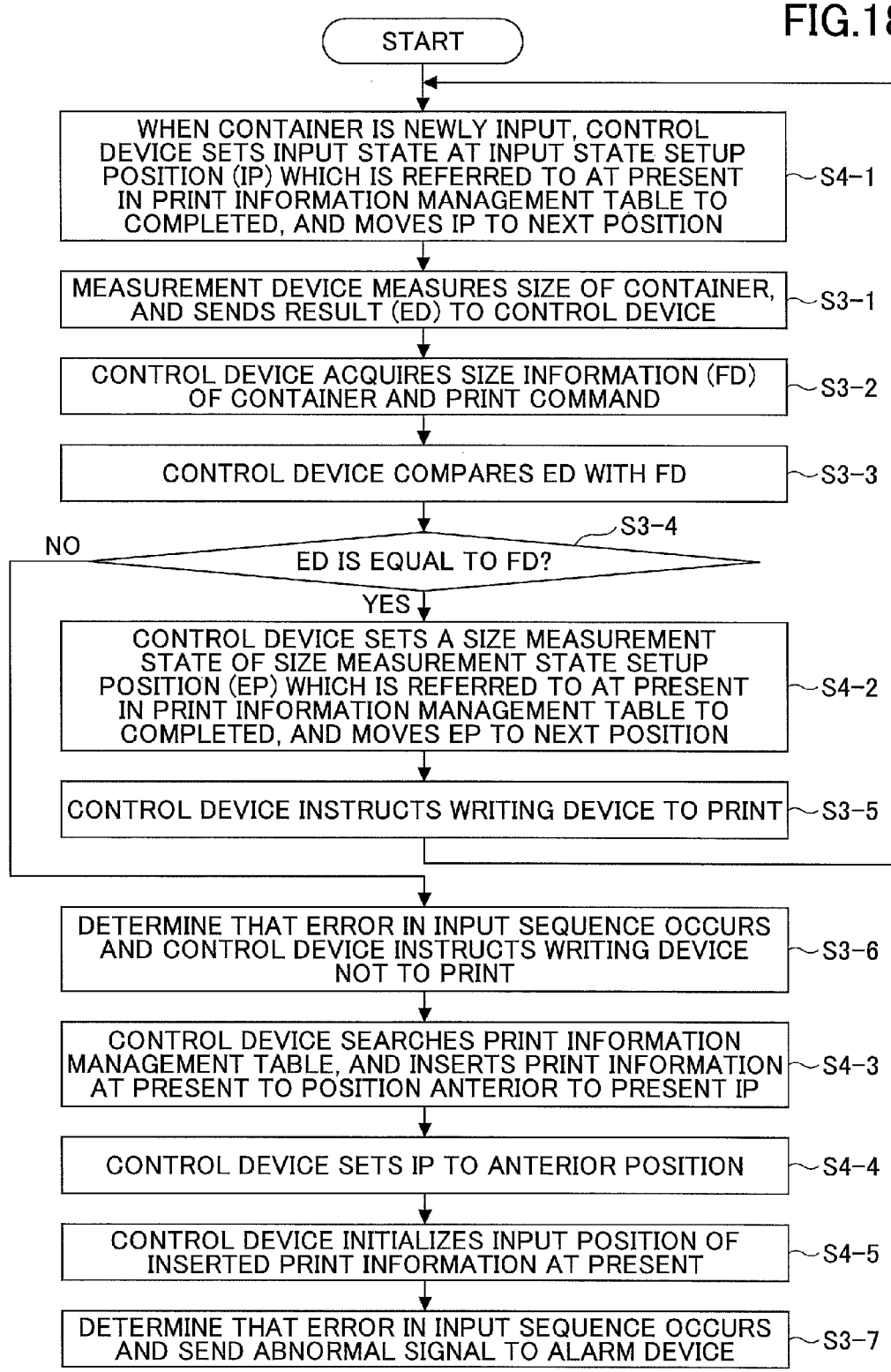
FIG. 18 is a flowchart illustrating an example of an operation of the physical distribution management system according to the fourth embodiment.

FIG. 18 is a flowchart illustrating an operation of the physical distribution management system according to the fourth embodiment. FIGS. 19A to 19C are diagrams illustrating content in the print information management table during the process of executing the flow shown in FIG. 18. In FIG. 18, to the step which is the same as the step in FIG. 16 (operations of the physical distribution management system according to the third embodiment) the same reference numeral as in FIG. 16 is assigned. This operation is executed by the functional blocks as shown in FIG. 17.

At first, the control device 33, when a container is input, sets an input state at a input state set position IP which is presently referred to in the print information management table DT to "completed", and sets the input state set position to the next position (step S4-1). Here, as a unit by which the control device 33 learns of a container inputting, a sensor, which is not shown, for sensing the input of the container is added to the configuration, or a unit that gives notice of the container input by the operator when the container is input is provided.

Here, using FIG. 19A, the print information management table DT will be explained. The print information management table DT shown in this figure is a table in which a field for managing the input state as management information and a field for managing a state of the measuring size as management information are added to the print information management table DT shown in FIG. 13. Meanwhile, the configuration of the print information management table DT is not limited to this.

In the present embodiment, in order to set the input state to "completed", a character string "completed" is simply entered in a corresponding field. However, the present invention is not limited to this. Numerical values such as "0" and "1" may be used for setting as the values for the state management. Such a detailed setting or specification may be present as long as each of the devices in the present embodiment can interpret.

Steps S3-1 to S3-4 following step S4-1 are steps which are executed also in the flows shown in FIG. 15, and are processes for comparing the result of measurement for size ED with the size information FD of the print object. At this time, the position on the print information management table DT where the control device 33 acquires the size information FD and the print information at step S3-2 is a position where the size measurement state setup position EP specifies at present on the print information management table DT shown in FIG. 19A.

When the control device 33 determines that the measurement result ED is equal to the size information FD at step S3-4 (step S3-4: YES), the control device 33 determines that the container 10 which is an object of determination at present is input in a correct sequence, sets a size measurement state of the size measurement state setup position EP which is referred to at present in the print information management table DT to a "completed" state, and moves the position of the size measurement state setup position EP to a next position (step S4-2). Next, the control device 33 instructs the writing device 30 to print, returns to step S4-1, and performs a process for a next container 10.

On the other hand, when the control device 33 determines that the measurement result ED is not equal to the size information FD at step S3-4 (Step S3-4: NO), the control device 33 determines that an error in input sequence occurs and instructs the writing device 30 not to print (step S3-6).

Next, the control device 33 searches the print information management table DT, and inserts (moves) the print information which is referred at present to a position anterior to the position where the input state setup position IP refers at present (step S4-3).

Using FIG. 19B, step S4-3 will be explained. In this figure, the print information which is referred at present is "print information number: 3". In the size measurement for "print information number 3", an error in input sequence is detected. That is, in FIG. 19B, size information of "print information number: 3" is "small", but a container 10 corresponding to "large" is input by a mistake by the operator or the like.

In FIG. 19B including the above case as an example, the print information which is referred at present is an information group with "print information number: 3" indicated by the size measurement state setup position EP. The process at step S4-3 is to move the above-described information group to a position anterior to the position indicated by the input state setup position IP, i.e. between "print information number: 4" and "print information number: 5".

Next, the control device 33 sets the input state setup position IP to a position anterior to the present position (step S4-4). This is a process which is performed due to the movement of the print information at present (to be re-input) at step S4-3.

At next step S4-5, the control device 33 initializes an input state of the present print information, i.e. the input information moved at step S4-3. A method of this initialization may be any initialization method as long as it is a setup that the control device 33 can treat as an input state. FIG. 19C shows an example of the state of the print information management table DT when step S4-5 is completed. Finally, the control device 33 sends an abnormal notification signal to the alarm device 34 (step S3-6).

By executing the flows, as described above, before performing printing for the container 10, an input sequence of which is an error, the error in input sequence can be detected. Furthermore, according to the automatic execution of the reordering for print information, the operator can perform the restoration process on re-starting only by picking out a container in which an error in input sequence occurs and re-input the container, without re-inputting all containers input after the container in which the error in input sequence occurs, and unnecessary work by the operator can be reduced.

Meanwhile, in FIGS. 19A to 19C, in the print information management table DT, two fields of the input state field and size measurement state field are newly provided. These fields are managed by two states of "completed state" and "initialized state (not set)". However, the present invention is not limited to this practically.

That is, for example, it may be configured that the print information management table DT has one new field of "container state", a state of which can take "initialized state (not set)", "input completed state", or "size measurement completed state". According to the change as above, the process steps explained in FIG. 18 are changed so as to be consistent with the configuration changed as above.

Meanwhile, in the case where the sequence of print information (the sequence of information printed on the container 10) affects not only a process for performing the print processing shown in FIG. 18 but also all processing following it, not only the reordering of the print information management table DT, also in a system which a print sequence affects, but also a process of reordering of a sequence of information which corresponds to the print information management table DT may be necessary. In such a case where, in the system which the print sequence affects, the process of reordering of the sequence of information which corresponds to the print information is difficult, the configuration shown in FIGS. 15 and 16 may be employed.

The present invention has been explained as above by showing specific embodiments. However, various variations and modifications of these embodiments may be made without departing from the scope of the present invention recited in claims. That is, the present invention may not be interpreted to be limited by the specification and drawings. In the following, variations will be cited.

(1) The control device 33 and the higher order device 40 are identical.

(2) The print information management table DT is provided in the writing device 30.

(3) As the writing device 30, instead of a laser marker, a label printer is employed.

(4) The writing device 30 and the readout device are configured to be detachable from each other.

(5) As the information recording medium applied to the container 10, instead of the rewritable type heat sensitive paper, a RFID (radio-frequency identification device) tag is used. In this case, the writing device 30 and the readout device 32 are a reader/a writer for the RFID.

(6) As the size information printed on the label 50, a human readable code is added to the barcode, or replaces the barcode.

(7) Plural kinds of containers each having different shapes from each other (vertically long, horizontally long, cylindrical shape, box or the like) are used. By using a camera as the measurement device 31, the shape is measured as a feature of the appearance of the container.

(8) Plural kinds of containers each having different color or surface property (smooth or rough) are used. By the measurement device 31, as a feature of appearance of the container, the color or the surface property is measured.

(9) By taking a picture of the container from an obliquely upward direction by a camera as the measurement device, external and internal images of the container are acquired. By processing the images, an inside dimension (volume) as a size of the container is measured.

The present application is based on and claims the benefit of priority of Japanese Priority Applications No. 2013-155068 filed on Jul. 25, 2013, and No. 2014-107565 filed on May 23, 2014, the entire contents of which are hereby incorporated by reference.

What is claimed is:

1. A physical distribution management system in which a plurality of containers with different sizes are input, the physical distribution management system being configured to determine an error in the inputting of the plurality of containers, the physical distribution management system comprising:
   a writing device configured to write on an information recording medium attached to each of the plurality of containers a size of a corresponding one of the plurality of containers according to a sequence based on which the plurality of containers are to be input, the plurality of containers being input into a conveyance unit of the physical distribution management system;
   a detector configured to detect the size of one or more of the plurality of containers that are input into the conveyance unit; and
   a controller configured to determine that the error in the inputting of the plurality of containers exists when the size written, according to the sequence, on the information recording medium attached to the one or more of the plurality of containers does not match with the size of the corresponding one of the one or more of the plurality of containers as detected by the detector.

2. The physical distribution management system as claimed in claim 1, further comprising;
   a reading device configured to read out the size of the plurality of containers written by the writing device on the information recording medium attached to each of the plurality of containers that are input into the conveyance unit.

3. The physical distribution management system as claimed in claim 1, wherein the controller is configured to manage the inputting of the plurality of containers and the sizes of the plurality of containers in association with each other.

4. The physical distribution management system as claimed in claim 1, wherein the detector is configured to detect the size of the one or more of the plurality of containers based on a feature of each of the one or more of the plurality of containers.

5. The physical distribution management system as claimed in claim 4, wherein the feature of each of the one or more of the plurality of containers includes at least one of an outer size of the corresponding one of the one or more of the plurality of containers and a shape of the corresponding one of the one or more of the plurality of containers.

6. The physical distribution management system as claimed in claim 5, wherein the detector is configured to detect the outer size of each of the one or more of the plurality of containers based on a height of each of the one or more of the plurality of containers.

7. The physical distribution management system as claimed in claim 1, wherein the information recording medium attached to each of the plurality of containers includes at least one of a rewritable type heat sensitive sheet and a radio-frequency identification device (RFID) tag.

8. The physical distribution management system as claimed in claim 1, wherein the writing device is configured to convert the size of each of the plurality of containers into a barcode and write the corresponding barcode on the information recording medium of the corresponding one of the plurality of containers.

9. The physical distribution management system as claimed in claim 1, further comprising:
an alarm unit configured to provide a notification of the error when the controller determines that the error exists.

10. The physical distribution management system as claimed in claim 1, wherein the controller is configured to instruct the writing device not to write the size of remaining ones of the plurality of containers when the controller determines that the error exists.

11. The physical distribution management system as claimed in claim 1, further comprising:
a conveyor unit controller configured to rearrange, upon the controller determining that the error exists, at least one of the plurality of containers corresponding to,
one of the plurality of containers with reference to which the controller determines that the error exist, and
any other ones of the plurality of containers subsequent to the one of the plurality of containers.

12. The physical distribution management system as claimed in claim 1, wherein when the detector determines that the error exists, a conveyor unit controller is configured instruct the writing device to rewrite, on a corresponding information recording medium, the size of at least one of the one of the plurality of containers corresponding to,
one of the plurality of containers with reference to which the controller determines that the error exist, and
any other ones of the plurality of containers subsequent to the one of the plurality of containers.

13. The physical distribution management system as claimed in claim 3, wherein the controller, upon determining that the error exists, is configured to reconfigure the sizes of the corresponding ones of the plurality of containers.

14. The physical distribution management system as claimed in claim 13, wherein the controller is configured to reconfigure the sizes of one of the plurality of containers with reference to which the controller determines that the error exists as well as any further ones of the plurality of containers subsequent to the one of the plurality of containers.

15. The physical distribution management system as claimed in claim 13, wherein the controller is configured to reconfigure only the size of one of the plurality of containers with reference to which the controller determines that the error exists.

16. A physical distribution management method for determining an error in inputting of a plurality of containers having different sizes in a physical distribution management system, the method comprising:
writing, on an information recording medium attached each of the plurality of containers a size of a corresponding one of the plurality of containers according to a sequence based on which the plurality of containers are to be input, the plurality of containers being input into a conveyance unit of the physical distribution management system;
detecting the size of one or more of the plurality of containers that are input into the conveyance unit; and
determining that the error in the inputting of the plurality of containers exists when the size written, according to the sequence, on the information recording medium attached to the one or more of the plurality of containers does not match with the size of the corresponding one of the one or more of the plurality of containers as detected by the detecting.

17. The physical distribution management method as claimed in claim 16, further comprising:
reading out the size of the plurality of containers written by the writing device on the information recording medium attached to each of the plurality of containers that are input into the conveyance unit.

18. The physical distribution management method as claimed in claim 16, further comprising:
managing the inputting of the plurality of containers and the sizes of the plurality of containers in association with each other.

19. The physical distribution management method as claimed in claim 16, further comprising:
rearranging, upon determining that the error exists, at least one of the plurality of containers corresponding to,
one of the plurality of containers with reference to which the controller determines that the error exists, and
any other ones of the plurality of containers subsequent to the one of the plurality of containers.

20. The physical distribution management method as claimed in claim 16, further comprising:
instructing a writing device, upon determining that the error exists, to rewrite, on a corresponding information recording medium, the size of at least one of the plurality of containers corresponding to,
one of the plurality of containers with reference to which the determining determines that the error exists, and
any other ones of the plurality of containers subsequent to the one of the plurality of containers.

\* \* \* \* \*